(12) United States Patent
Ayuzawa et al.

(10) Patent No.: US 11,692,502 B2
(45) Date of Patent: Jul. 4, 2023

(54) ENGINE IGNITION METHOD AND ENGINE IGNITION DEVICE

(71) Applicant: MAHLE ELECTRIC DRIVES JAPAN CORPORATION, Shizuoka-ken (JP)

(72) Inventors: Takuma Ayuzawa, Numazu (JP); Masayuki Sugiyama, Numazu (JP); Naoya Takamura, Numazu (JP)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 262 days.

(21) Appl. No.: 16/496,567

(22) PCT Filed: Mar. 30, 2017

(86) PCT No.: PCT/JP2017/013302
§ 371 (c)(1),
(2) Date: Sep. 23, 2019

(87) PCT Pub. No.: WO2018/179244
PCT Pub. Date: Oct. 4, 2018

(65) Prior Publication Data
US 2021/0017946 A1   Jan. 21, 2021

(51) Int. Cl.
*F02P 1/08*     (2006.01)
*F02D 45/00*    (2006.01)
(Continued)

(52) U.S. Cl.
CPC .............. *F02D 45/00* (2013.01); *F02P 1/086* (2013.01); *F02P 3/04* (2013.01); *F02P 3/0407* (2013.01);
(Continued)

(58) Field of Classification Search
CPC . F02D 2041/0092; F02P 15/10; F02P 3/0407; F02P 1/086; F02P 9/007; F02P 3/08; H02J 7/345
See application file for complete search history.

(56) References Cited

U.S. PATENT DOCUMENTS 2,901,670 A * 8/1959 Sunstein ................ H05B 41/34
                                              315/219
3,498,281 A * 3/1970 Harmness ............... F02P 1/086
                                              315/209 R
(Continued)

FOREIGN PATENT DOCUMENTS

CN       1475669 A    2/2004
CN     101641517 A    2/2010
(Continued)

OTHER PUBLICATIONS

International Search Report for PCT/JP2017/013302, dated Jun. 7, 2017.

*Primary Examiner* — Logan M Kraft
*Assistant Examiner* — Joshua Campbell
(74) *Attorney, Agent, or Firm* — Pearne & Gordon LLP

(57) ABSTRACT

In an engine ignition method according to the present invention, an ignition coil and an exciter coil are provided in a magneto generator driven by an engine. After charging an ignition capacitor using an output voltage of the exciter coil, the ignition capacitor is discharged through a primary coil of the ignition coil at an ignition timing of the engine, whereby a high voltage induced in a secondary coil of the ignition coil is applied to an ignition plug and a first spark discharge is generated in the ignition plug, and a voltage induced in the secondary coil of the ignition coil accompanied with rotation of the magneto rotor is applied to the ignition plug in a state that insulation across discharge gaps of the ignition plug is broken down due to the first spark discharge, whereby a second spark discharge is produced in the ignition plug.

15 Claims, 16 Drawing Sheets

(51) Int. Cl.
*F02P 3/04* (2006.01)
*F02D 41/00* (2006.01)
*F02P 17/12* (2006.01)
*H02J 7/14* (2006.01)
*H02J 7/34* (2006.01)

(52) U.S. Cl.
CPC .... *F02P 3/0442* (2013.01); *F02D 2041/0092* (2013.01); *F02P 17/12* (2013.01); *H02J 7/14* (2013.01); *H02J 7/345* (2013.01)

(56) References Cited

U.S. PATENT DOCUMENTS

| | | | | |
|---|---|---|---|---|
| 5,067,462 A | * | 11/1991 | Iwata | F02P 15/08 123/643 |
| 2008/0191700 A1 | * | 8/2008 | Shimazaki | F02P 17/00 324/382 |
| 2010/0095932 A1 | | 4/2010 | Nakauchi et al. | |
| 2014/0318488 A1 | | 10/2014 | Kawagoe et al. | |
| 2017/0030319 A1 | * | 2/2017 | Toriyama | F02P 11/00 |

FOREIGN PATENT DOCUMENTS

| | | | | | |
|---|---|---|---|---|---|
| CN | 103890379 A | | 6/2014 | | |
| EP | 1387084 A2 | | 2/2004 | | |
| EP | 1387084 A2 | * | 2/2004 | | F02P 1/04 |
| JP | 55-137356 | | 10/1980 | | |
| JP | 55137356 A | * | 10/1980 | | |
| JP | 59-229055 | | 12/1984 | | |
| JP | 10-184509 | | 7/1998 | | |
| JP | 2003343407 A | * | 12/2003 | | |
| JP | 2011236736 A | * | 11/2011 | | F02P 1/086 |
| JP | 2014-196674 | | 10/2014 | | |

* cited by examiner

ENGINE IGNITION METHOD AND ENGINE IGNITION DEVICE

TECHNICAL FIELD

The present invention relates to a capacitor discharge engine ignition method and engine ignition device.

BACKGROUND ART

Capacitor discharge engine ignition devices, as for example shown in Patent Document 1, are configured by an exciter coil that is provided in a magneto generator driven by an engine and induces an AC voltage in accompaniment with rotation of the engine, an ignition coil that has a primary coil and a secondary coil, an ignition capacitor that is provided on the primary side of the ignition coil and is charged to one polarity with a voltage induced in the exciter coil, a thyristor that is provided so as to discharge, through the primary coil of the ignition coil, electric charge accumulated by the ignition capacitor when an ON state is assumed, and a control circuit that performs control so that the thyristor is placed into the ON state at an ignition timing of the engine (an internal combustion engine).

The magneto generator is provided with a magneto rotor that is attached to a crank shaft of the engine, and with a stator having an armature core and the exciter coil. The armature core has a magnetic pole part that opposes a magnetic pole of the magneto rotor, and the exciter coil is wound around the armature core. The magneto generator induces an AC voltage in the exciter coil in accompaniment with rotation of the engine. In the ignition device shown in Patent Document 1, the ignition coil is also wound around the armature core around which the exciter coil is wound, and the ignition capacitor is also charged by a voltage induced in the primary coil of the ignition coil accompanying rotation of the magneto rotor.

In this type of ignition device, the ignition capacitor is charged at a timing preceding an ignition timing of the engine, and the thyristor is placed into the ON state at the ignition timing. When the thyristor is placed into the ON state, a high-frequency oscillating current flows on the primary side of the ignition coil as a result of electric charge that had been accumulated by the ignition capacitor being discharged through the thyristor and the primary coil of the ignition coil. This primary current causes magnetic flux having an oscillating waveform that changes at a high frequency to flow to an iron core in the ignition coil. Change in this magnetic flux induces a high voltage having an oscillating waveform in the secondary coil of the ignition coil, and this high voltage is applied to a discharge gap of an ignition plug. This causes dielectric breakdown to occur across the discharge gap of the ignition plug and produces a spark discharge, as a result of which ignition of the engine is performed.

Discharge produced when a high voltage that has been induced in the secondary coil of the ignition coil by discharging, through the primary coil of the ignition coil, electric charge accumulated by the ignition capacitor is applied across the discharge gap of the ignition plug is called capacitive discharge. Capacitive discharge is performed using a high voltage induced in the secondary coil of the ignition coil that rises extremely quickly. Thus, with a capacitor discharge ignition device, ignition is able to be reliably performed at the same time a high voltage used for ignition is generated regardless of the breakdown voltage of the discharge gap of the ignition plug, and ignition timings can be stabilized even when the breakdown voltage of the discharge gap of the ignition plug is in an unstable state, such as when at high engine speeds. However, because the release of energy accumulated by the ignition capacitor ends after a short amount of time, a capacitive discharge can only be sustained for very short periods of time. For this reason, when requests are made that a duration of spark discharges be made longer and that ignition performance be further improved in cases in which a capacitor discharge ignition device is used, it has been difficult to meet such demands.

Known engine ignition devices also include inductive (current-interrupting) ignition devices with which a high voltage is induced in a secondary coil as a result of a sudden change in magnetic flux occurring in an iron core of an ignition coil due to the interruption of current that had been flowing in the primary coil of the ignition coil, and an ignition operation is performed by applying this high voltage is applied to an ignition plug. In an inductive ignition device, a discharge is produced in the ignition plug by releasing energy accumulated by the ignition coil while current had been flowing through the primary coil of the ignition coil. Because this release of energy accumulated by the ignition coil is performed comparatively slowly, the duration of spark discharges is able to be made longer in cases in which an inductive ignition device is used. Discharge produced in the discharge gap of the ignition plug by an inductive ignition device is called inductive discharge.

An advantage of using an inductive ignition device is that, because the duration of spark discharges produced in the ignition plug is able to be made longer, sufficient thermal energy can be provided to fuel in a cylinder, and the fuel can be reliably combusted. However, because a secondary voltage in the ignition coil rises slowly in cases in which an inductive ignition device is used, the timing at which discharge begins in the ignition plug varies when at high engine speeds where the breakdown voltage of the discharge gap of the ignition plug is unstable, and it is difficult to stabilize ignition timings when at high engine speeds.

As described above, there are advantages and disadvantages to both capacitor discharge ignition devices and inductive ignition devices. An ideal ignition spark, which rises quickly and is of long duration, it not easily obtained using either ignition device. It is in this light that an engine ignition device has been proposed that aims to obtain characteristics obtained by capacitor discharge ignition devices and characteristics obtained by inductive ignition devices, as shown in Patent Document 2.

The ignition device shown in Patent Document 2 is provided with an ignition capacitor that is charged with output from a DC high-voltage power supply, a transistor switch that is connected, in series, to a primary coil of an ignition coil and that switches current flowing through the primary coil ON/OFF, a thyristor that discharges, through the primary coil of the ignition coil and a primary current control switch, an electric charge of the ignition capacitor when an ON state is assumed, and a battery that provides a voltage for causing a primary current to flow through primary coil of the ignition coil and the primary current control switch. In this ignition device, the DC high-voltage power supply, the ignition capacitor, and thyristor, and the transistor switch configure a capacitor discharge ignition circuit and the primary coil of the ignition coil, the transistor switch, and the battery configure an inductive ignition circuit, whereby the ignition device aims to obtain characteristics obtained by capacitor discharge ignition devices and characteristics obtained by inductive ignition devices.

In the ignition device shown in Patent Document 2, at an ignition timing of the engine, the thyristor is placed into the ON state in a state in which there is electrical continuity through the transistor switch, and after capacitive discharge has been performed in the ignition plug by discharging the ignition capacitor through the thyristor, the primary coil of the ignition coil, and the transistor switch, the transistor switch is placed into the OFF state, whereby current that had been flowing from the battery through the primary coil of the ignition coil and the transistor switch is interrupted and inductive discharge is performed in the ignition plug.

PRIOR ART DOCUMENTS

Patent Documents

[Patent Document 1] Japanese Laid-open Patent Application No. 59-229055
[Patent Document 2] Japanese Laid-open Patent Application No. 2014-196674

DISCLOSURE OF THE INVENTION

Problems to be Solved by the Invention

Because spark discharges can only be produced in the ignition plug for very short periods of time in cases in which a conventional capacitor discharge ignition device is used, there is a risk that, depending on the operating state of the engine, a situation will arise in which ignition energy is insufficient and complete combustion of fuel in the cylinder cannot be performed.

As shown in Patent Document 2, it is conceivable to extend the duration of spark discharges by adopting a configuration that combines an inductive ignition circuit and a capacitor discharge ignition circuit. However, because a battery is needed in order to configure the inductive ignition circuit, the configuration shown in Patent Document 2 is not applicable to cases in which the device driven by the engine is not equipped with a battery.

In order for the engine to operate optimally, it is necessary to control various control conditions, such as the speed of the engine and a temperature of the engine, so that ignition of the engine can be performed at optimum timings. Generally, a rotational position of the crank shaft when a piston reaches top dead center in a compression stroke of the engine is taken to be a top dead center position of the compression stroke, a rotational position of the crank shaft advanced a prescribed angle beyond the top dead center position is taken to be a maximum advance position, a rotational position of the crank shaft a prescribed angle behind the maximum advance position is taken to be a maximum delay position, and a crank position where ignition of the engine is performed is set between the maximum advance position and the maximum delay position.

In the present specification, the rotational position of the crank shaft of the engine is referred to as a crank angle position, and a crank angle position where an ignition operation of the engine begins and a timing at which the ignition operation begins are respectively referred to as an ignition position and an ignition timing. Further, the crank angle positions when a piston of the engine has reached top dead center at an end of a compression stroke and at an end of an exhaust stroke of the engine are respectively called a top dead center position of the compression stroke and the top dead center position of the exhaust stroke.

Control of the ignition timing of the engine at which ignition is performed by a capacitor discharge ignition device, in other words control of the ignition position, is performed by controlling the timing that a switch (generally a thyristor) that discharges the ignition capacitor is placed into an ON state. Information relating to the crank angle position of the engine and information relating to the speed of the engine are needed when controlling the ignition timing. In the ignition device shown in Patent Document 1, information relating to speed, and information relating to the crank position of the engine are obtained based on a timing at which a zero-crossing point or a peak point in a waveform of voltage induced in a coil provided in the magneto generator is detected and the period at which these points are detected, to control the ignition timing of the engine. It is also common to attach, to the engine, a pulse signal generator that generates a pulse signal when the crank position of the engine matches a set position and to obtain information relating to the crank position and the speed of the engine from a pulse signal generated by the pulse signal generator to control the ignition timing.

As described above, in cases in which an ignition device is configured so as to yield information relating to the speed of the engine and information relating to the rotational position of the crank shaft based on a waveform of voltage induced in a magneto coil provided in the magneto generator or on a pulse signal outputted by a pulse signal generator attached to the engine to control an ignition timing, because an ignition operation is performed in the vicinity of a top dead center position each time the crank shaft goes through one rotation, when the engine in a four-cycle engine, an ignition operation is performed not only at a regular ignition position set in the vicinity of the top dead center position of the compression stroke, but also at an ignition position set in the vicinity of the top dead center position of the exhaust stroke.

In cases in which the combustion of fuel by regular ignition in an expansion stroke is complete, operation of the engine will not be impeded even if ignition of the engine is performed in the vicinity of the top dead center position of the exhaust stroke. However, in cases in which there is insufficient combustion in the expansion stroke, when an ignition operation is performed in the vicinity of the top dead center position of the exhaust stroke, the fuel remaining in the cylinder will combust and after-fire will occur, and there is a risk of damage to the engine. Moreover, in cases in which an ignition operation is performed both in the vicinity of the top dead center position of the expansion stroke and in the vicinity of the top dead center position of the compression stroke, the life of the ignition plug is shortened because the of the high frequency at which sparks are produced in the ignition plug.

A main object of the present invention is to provide a capacitor discharge engine ignition method and engine ignition device with which, at ignition timings of an engine, spark discharges that rise quickly and moreover have long discharge durations are produced across a discharge gap of an ignition plug and ignition energy can be increased without adding any circuit elements for configuring an inductive ignition Another object of the present invention is to provide a capacitor discharge engine ignition method and engine ignition device with which it is possible to discriminate whether a stroke that ends with a piston of an engine reaching top dead center is an exhaust stroke or a compression stroke and perform an ignition operation only at a regular ignition timing of the engine set in the vicinity of a top dead center position of the compression stroke of the engine.

Means to Solve the Problems

The present invention is directed to a method for igniting an engine by spark discharges produced in an ignition plug attached to a cylinder of the engine and performing ignition of the engine.

The ignition method according to the present invention includes the steps of: providing a magneto generator which has a magneto rotor driven by the engine and a stator having an armature core around which a plurality of coils including an exciter coil, a primary coil and a secondary coil of an ignition coil are wound as magneto coils and induces an AC voltage in the magneto coils accompanied with rotation of the engine, an ignition capacitor, and an ignition plug to which a voltage induced in the secondary coil of the ignition coil is applied; charging the ignition capacitor to one polarity with a voltage induced in the exciter coil; then discharging, through the primary coil of the ignition coil, electric charge accumulated in the ignition capacitor and producing a first spark discharge across a discharge gap of the ignition plug at an ignition timing of the engine; and then producing a second spark discharge across the discharge gap by applying a voltage induced in the secondary coil of the ignition coil accompanied with a change in magnetic flux that is inputted to the armature core from the magneto rotor, while the discharge gap is in a state in which insulation across the discharge gap is broken down due to the first spark discharge; whereby the engine is ignited by the first spark discharge and the second spark discharge.

In conventional capacitor discharge ignition devices, because spark discharges can only be produced for extremely short periods of time lasting until energy that had been accumulated in the ignition capacitor has been completely discharged, there is risk that ignition energy will be insufficient.

In the ignition method of the present invention, the ignition coil is wound around the armature core of the magneto generator together with the exciter coil so that a voltage is also induced in the secondary coil of the ignition coil accompanied with rotation of the magneto rotor, and after a first spark discharge is produced in the ignition plug as a result of discharging the ignition capacitor, a voltage induced in the secondary coil of the ignition coil accompanied with a change in magnetic flux that is inputted to the armature core from the magneto rotor is applied to the ignition plug in a state in which insulation across the discharge gap has been broken down due to the first spark discharge, and a second spark discharge is produced across the discharge gap of the ignition plug. As a result, the duration of spark discharges is able to be extended.

With the present invention, after producing a quickly rising first spark discharge at an ignition timing, a second spark discharge is generated while a voltage greater than or equal to a threshold value is being applied across the discharge gap of the ignition plug from the secondary coil of the ignition coil. This produces spark discharges that rise quickly and moreover have long durations, enabling ignition timings to be stabilized and ignition energy to be increased.

The second spark discharge is produced by applying across the discharge gap of the ignition plug a voltage induced in the secondary coil of the ignition coil due to a change in magnetic flux produced in the armature core accompanied with rotation of the magneto rotor in a state that insulation across the discharge gap is broken down. The second spark discharge continues for a period during which the secondary coil generates a voltage greater than or equal to a threshold value which is a lower limit for a voltage that needs to be applied across a discharge gap across which insulation is broken down in order to produce a discharge across the discharge gap. In this point, the second spark discharge differs from the inductive discharge which is produced only until energy that had been accumulated in the ignition coil has been completely released when an inductive ignition device is used.

In order to carry out the ignition method of the present invention, after generating a first spark discharge, a voltage of a level needed in order to produce a second spark discharge across a discharge gap of an ignition plug needs to be reliably induced in the secondary coil of the ignition coil, while insulation across the discharge gap is in a broken down state.

After a first spark discharge is generated, a phenomenon (armature reaction) such that magnetic flux flowing through the armature coils is reduced and/or changes in the magnetic flux produced in the armature core accompanied with rotation of the magneto rotor are counteracted, may occur due to the synthesis of magnetic flux that is inputted to the armature core from the magneto rotor and magnetic flux flowing to the armature core from the magneto coils wrapped around the armature core. In order to reliably induce a voltage for producing a second spark discharge in the secondary coil, it is necessary to ensure, to the extent possible, that the above phenomenon does not occur immediately after a first spark discharge is generated. To do so, it is preferable that current flow through at least the exciter coil and the primary coil of the magneto coils wound around the armature core of the magneto generator is prevented, when a second spark discharge is produced.

The present invention is further directed to an engine ignition device that applies a high voltage to an ignition plug attached to a cylinder of an engine and produces spark discharges in the ignition plug. The engine ignition device according to the present invention is configured by: a magneto generator that is provided with a magneto rotor having a three-pole magnetic field formed at an outer circumference of a flywheel attached to a crank shaft of the engine and a stator having an armature core with a magnetic pole part opposed to the poles of the magnetic field of the magneto rotor and having plurality of coils served as magneto coils which are wound around the armature core, the plurality of coils including an exciter coil and a primary coil of an ignition coil and a secondary coil of the ignition coil, the magneto generator sequentially outputting, from the magneto coils, a first half-wave voltage, a second half-wave voltage of a different polarity from the first half-wave voltage, and a third half-wave voltage of the same polarity as the first half-wave voltage during one rotation of the crank shaft; an ignition capacitor that is provided on a primary side of the ignition coil; a charging switch that is provided so as to be turned on when the second half-wave voltage is induced in the exciter coil and to form a circuit that charges the ignition capacitor with the second half-wave voltage; an ignition switch that is provided so as to form a discharging circuit that discharges, through the primary coil, electric charge accumulated in the ignition capacitor when the ignition switch is turned on; an ignition timing detection means for generating an ignition signal when an ignition timing of the engine is detected; and a switch control means that is provided with a means for placing the ignition switch to be turned on in order to produce a first spark discharge in the ignition plug when the ignition timing is detected and a means for controlling the ignition switch and the charging switch so as to give rise to a state in which both the ignition switch and the charging switch are in an open state while insulation across a discharge gap of the ignition plug is in a broken down state due to the first spark discharge; wherein the engine ignition device being configured so that a second spark discharge is produced in the ignition plug due to a voltage induced in the secondary coil of the ignition coil accompanied with a change in magnetic flux that is inputted to the armature core from the magneto rotor while the insulation across the discharge gap of the ignition plug is in the broken down state due to the first spark discharge.

In one preferred aspect of the present invention, the engine ignition device is provided with a rotation detection circuit that detects a specific feature in a waveform of voltage induced in the exciter coil and outputs a plurality of rotation detection signals which include a rotation detection signal generated at a reference position set at a position coming before a crank angle position coming when a piston of the engine reaches top dead center, and a reference signal identification means for identifying, from among the plurality of rotation detection signals outputted by the rotation detection circuit, a rotation detection signal generated at the reference position as a reference signal; and the ignition timing detection means is configured so as to detect the ignition timing based on a timing at which the reference signal was generated and generate an ignition signal.

In the present specification, a "specific feature" in a waveform of voltage induced in the exciter coil is a feature that, of the parts of the voltage waveform, is able to be distinguished and specified from among other portions of the voltage waveform. This is, for example, a zero-crossing point, a peak point, a point where an instantaneous value reaches a set threshold level, or the like.

In another aspect of the present invention, the engine ignition device is provided with a stroke discrimination means for discriminating whether a stroke of the engine performed when the reference signal was generated is a compression stroke or an exhaust stroke. In this case, the switch control means is configured so as to perform control that places the ignition switch in the ON state at the ignition timing detected by the ignition timing detection means only when the stroke of the engine performed when the reference signal was generated is discriminated to be a compression stroke by the stroke discrimination means.

The stroke discrimination means can be provided with a break down voltage detection circuit that obtains a voltage signal including information relating to a voltage across the discharge gap of the ignition plug from partway along the secondary coil, and can be configured so as to perform stroke discrimination on the basis of the fact that a magnitude of a voltage signal obtained from the breakdown voltage detection circuit when the insulation across the discharge gap of the ignition plug is—broken down differs between when a stroke of the engine is an exhaust stroke and when a stroke of the engine is a compression stroke.

To detect the dielectric breakdown voltage of the ignition plug without being influenced by high voltage induced in the secondary coil of the ignition coil, it is preferable, for example, that a tap be led out from a middle of the secondary coil, and that the breakdown voltage detection circuit be configured so as to detect a voltage induced partway along the secondary coil through the tap.

When the stroke discrimination means is provided as above and the switch control means is configured so as to perform control that places the ignition switch in the ON state at the ignition timing detected by the ignition timing detection means only when the stroke of the engine when the reference signal was generated is discriminated to be a compression stroke by the stroke discrimination means, an ignition operation can be prevented from being performed in a final stage of an exhaust stroke, enabling the combustion of gas and the generation of after-fire to be prevented in cases in which uncombusted gas is left in the cylinder in an exhaust stroke as a result of fuel not being completely combusted in a expansion stroke, such as during sudden acceleration of the engine.

Moreover, when the stroke discrimination means is provided as above, wasteful ignition is not performed in a final stage of an exhaust stroke, enabling the ignition capacitor to be charged to a sufficiently high voltage in a period leading up to an ignition timing, and enabling a reduction in ignition performance due to an insufficient ignition capacitor charging voltage to be prevented.

When configured as above, wasteful ignition is not performed in a final stage of an exhaust stroke. This prevents needless wear on the electrodes of the ignition plug, enabling the life of the ignition plug to be extended.

In cases in which a magneto generator provided with a magneto rotor formed with a three-pole magnetic field at the outer circumference of a flywheel attached to a crank shaft of the engine is used, of the first half-wave voltage to the third half-wave voltage, the voltage with the highest peak value is the second half-wave voltage. Consequently, it is preferable that the ignition timing be set in a period of time during which the second half-wave voltage induced in the exciter coil moves toward a peak, and that the switch control means places the ignition switch into the ON state at such ignition timing. With this configuration, when both the ignition switch and the charging switch have been placed into the open state after a first spark discharge is generated in the ignition plug, a voltage greater than or equal to a threshold value is reliably applied to the ignition plug from the secondary coil of the ignition coil, enabling a second spark discharge to be reliably produced.

Further, in case in which a magneto generator such as that described above is used, of the first half-wave voltage to the third half-wave voltage induced in the exciter coil, the half-wave with the greatest width is the second half-wave voltage. Accordingly, when the ignition timing is set in an interval in which the second half-wave voltage moves toward a peak, the amount of time over which an output voltage of the magneto generator is applied to the ignition plug from the secondary coil of the ignition coil after the first spark discharge is produced is made longer, enabling the amount of time over which a second spark discharge is produced to be made longer, and enabling a greater amount of ignition energy to be obtained.

In a preferred aspect of the ignition device according to the present invention, a damper diode is connected, in parallel, across both ends of the ignition capacitor, the damper diode being pointed in an orientation so that when the ignition capacitor is in a state charged to one polarity, a voltage across both ends of the ignition capacitor is applied in an opposite direction across an anode and a cathode of the damper diode.

When the damper diode is connected in parallel to the ignition capacitor in such manner, an interval of an initial half-wave of high voltage induced in the secondary coil of the ignition coil when the ignition capacitor has been discharged can be made longer, enabling a set-up for consecutively generating a first spark discharge and a second spark discharge to be simplified.

In a preferred aspect of the ignition device according to the present invention, the engine ignition device is provided with a power supply circuit that, using the first half-wave voltage and the third half-wave voltage induced in the exciter coil as a power supply voltage, generates a control DC voltage, and the engine ignition device is provided with a CPU that operates using the control DC voltage generated by the power supply circuit as a power supply voltage, and the switch control means and the stroke discrimination means are configured by the CPU executing a program that has been prepared in advance.

With this configuration, the present invention can also be applied to engine drive apparatuses not equipped with a battery.

In another preferred aspect of the ignition device according to the present invention, the primary coil of the ignition coil is wound around a primary bobbin attached to the armature core, a secondary bobbin is disposed so as to encompass the primary bobbin, and the secondary coil of the ignition coil and the exciter coil are wound around the secondary bobbin. Further, the secondary coil and the exciter coil are configured by winding a single conductor around the secondary bobbin.

With this configuration, winding of the ignition coil and the exciter coil can be simplified, enabling manufacturing costs to be reduced.

In a preferred aspect of the ignition device according to the present invention, the exciter coil is configured by a pair of coils that are wound in the same direction and connected to one another in parallel.

When the exciter coil is configured in this manner, a resistance of the exciter coil is reduced and loss in the circuit that charges the ignition capacitor is reduced, enabling the ignition capacitor to be charged to a higher voltage.

Other aspects of the present invention will be made more apparent in the description of the embodiment for carrying out the present invention given below.

Advantageous Effects of the Invention

With the present invention, after a first spark discharge is produced in the ignition plug as a result of discharging, through the primary coil of the ignition coil, electric charge accumulated by the ignition capacitor at an ignition timing of the engine, a voltage induced in the secondary coil of the ignition coil due to a change in magnetic flux that is inputted to the armature core from the magneto rotor is applied to the ignition plug in a state that insulation across the discharge gap of the ignition plug is broken down due to the first spark discharge, whereby a second spark discharge is next produced in the ignition plug. As a result, spark discharges are produced that rise quickly and moreover have much longer durations than when a conventional capacitor discharge ignition device is used, enabling ignition timings to be stabilized and ignition energy to be increased, and enabling performance of the engine ignition device to be improved.

Further, in the present invention, in cases in which the engine ignition device is provided with a stroke discrimination means for discriminating whether a stroke of the engine when a reference signal used for detecting a reference position when an ignition timing is detected was generated is a compression stroke or an exhaust stroke, and the switch control means is configured so as to perform control that places the ignition switch in the ON state at the ignition timing detected by the ignition timing detection means only when the stroke of the engine when the reference signal was generated is discriminated to be a compression stroke by the stroke discrimination means, combustion in an exhaust stroke and the generation of after-fire can be prevented in cases in which the combustion of fuel in a power stroke is incomplete, such as during sudden acceleration of the engine. Because wasteful discharge is no longer performed in the ignition plug in a final stage of an exhaust stroke, the life of the ignition plug is able to be prolonged. Moreover, because engine stroke discrimination is performed on the basis of the fact that a voltage detected from the secondary coil of the ignition coil differs between a compression stroke and an exhaust stroke of the engine, and without using a cam sensor or other electromechanical sensor, the ignition device is able to be endowed with stroke discrimination functionality without incurring increased cost.

MODE FOR CARRYING OUT THE INVENTION

Figure 1:
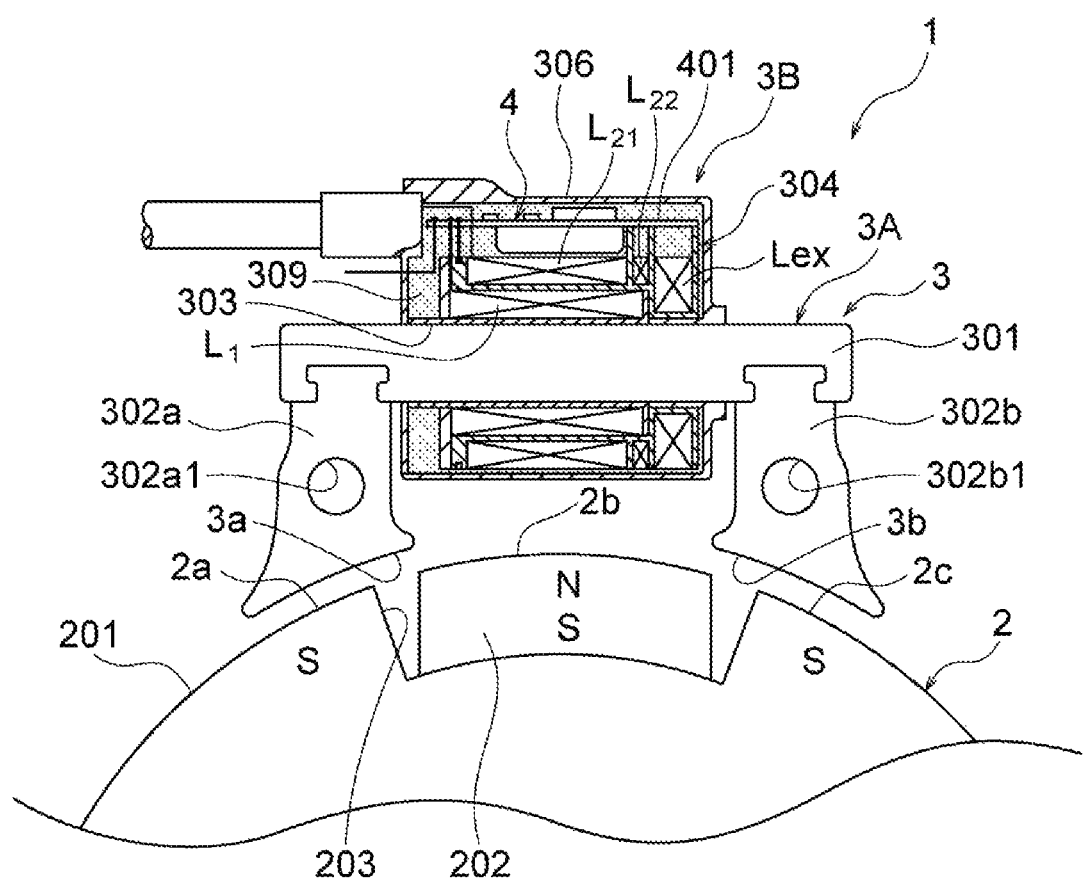
FIG. 1 is a front view illustrating a hardware configuration of an embodiment of an engine ignition device according to the present invention in partial cross-section.

<Ignition Method According to the Present Invention>

As stated above, because a high voltage used for ignition that rises quickly can be applied to the ignition plug in cases in which a capacitor discharge ignition method is used, ignition is able to be reliably performed at the same time a high voltage used for ignition is generated regardless of the breakdown voltage of the discharge gap of the ignition plug, and ignition timings can be stabilized. However, the release of energy accumulated in the ignition capacitor ends after a short amount of time, and because spark discharges (capacitive discharges) obtained as a result of discharging the ignition capacitor can only be sustained for very short periods of time, in cases in which a capacitor discharge ignition method is used, it is not possible to obtain an amount of ignition energy as large as that due to inductive discharge.

The present inventors considered that if the ignition coil is wound around the armature core of the magneto generator, and after a first spark discharge is produced in the ignition plug as a result of a high voltage induced in the secondary coil of the ignition coil by discharging the ignition capacitor, a voltage induced in the secondary coil of the ignition coil due to a change in magnetic flux inputted to the armature core from the magneto rotor is applied to the ignition plug while insulation across the discharge gap of the ignition plug is in broken down state (a state in which discharge can be produced by the mere application of a comparatively low voltage across the discharge gap) due to the first spark discharge, the first spark discharge and the second spark discharge are consecutively generated and the duration of spark discharge could be greatly extended.

The present invention has been made on the basis of ideas such as described above, and an ignition method according to the present invention includes the steps of providing a magneto generator which has a magneto rotor driven by the engine and a stator having an armature core around which a plurality of coils including an exciter coil, a primary coil and a secondary coil of an ignition coil are wound as magneto coils and induces an AC voltage in each magneto coil accompanied with rotation of the engine, an ignition capacitor, and an ignition plug to which a voltage induced in the secondary coil of the ignition coil is applied; charging the ignition capacitor to one polarity with a voltage induced in the exciter coil; discharging, through the primary coil of the ignition coil, electric charge accumulated by the ignition capacitor and producing a first spark discharge across a discharge gap of the ignition plug at an ignition timing of the engine; and then producing a second spark discharge across the discharge gap by applying a voltage induced in the secondary coil of the ignition coil accompanied with a change in magnetic flux that is inputted to the armature core from the magneto rotor, while the discharge gap is in a state in which insulation thereacross is broken down due to the first spark discharge; and performing ignition of the engine using the first spark discharge and the second spark discharge.

With the present invention, after first producing a quickly rising capacitive discharge at an ignition timing (when ignition begins) and then promptly producing a spark discharge in the ignition plug, a spark discharge is able to be sustained while an output voltage of the magneto generator is being applied across the discharge gap of the ignition plug from the secondary coil of the ignition coil. This produces spark discharges that rise quickly and moreover have long durations, enabling ignition timings to be stabilized and ignition energy to be increased.

The second spark discharge is produced by applying a voltage induced in the secondary coil of the ignition coil accompanied with rotation of the of the magneto rotor across the discharge gap of the ignition plug in a state that insulation thereacross is broken down. The second spark discharge continues for a period during which the secondary coil generates a voltage greater than or equal to a threshold value. In this point, the second spark discharge differs from the inductive discharge which is produced only until energy accumulated in the ignition coil is completely released in cases in which an inductive ignition device is used.

After various experimentation with the ignition method according to the present invention, it became apparent that a spark discharge of a long duration that contributes to ignition could not be reliably produced following a capacitive discharge by merely adopting a configuration in which the ignition coil of a capacitor discharge ignition device is wound around the armature core of a magneto generator.

Upon further deliberation, it was surmised that the reason why only capacitive discharge could be produced even after providing the ignition coil in the magneto generator and inducing an output voltage of the magneto generator in the secondary coil of the ignition coil is because, due to armature reaction produced by current flow through a magneto coil other than the secondary coil of the ignition coil immediately after the ignition capacitor has been discharged, a voltage greater than or equal to the threshold value cannot be induced in the secondary coil of the ignition coil immediately after the ignition capacitor has been discharged.

From this, it became apparent that when carrying out the ignition method according to the present invention, in order to ensure, to the extent possible, that armature reaction is not produced in the magneto generator when a second spark discharge is produced, it is preferable that, of magneto coils other than the secondary coil of the ignition coil, there be no current flow through at least the primary coil of the ignition coil and the exciter coil when a second spark discharge is produced.

As described above, in order to induce a voltage greater than or equal to a threshold value in the secondary coil of the ignition coil when a second spark discharge is produced, it is preferable that a state be adopted in which, of magneto coils other than the secondary coil of the ignition coil, there is no current flow through at least the exciter coil and the primary coil of the ignition coil. In such case, control for ensuring that there is no current flow through the exciter coil may be performed immediately before producing a second spark discharge, or this control may be performed at any timing set in an interval from a timing at which charging of the ignition capacitor finishes and a timing at which the second spark discharge is produced.

<Example Configuration of the Magneto Generator Used in Embodiments of the Ignition Device According to the Present Invention>

Next, embodiments of an ignition device that carry out an ignition method according to the present invention will be described.

Although the present invention can be applied to single-cylinder engines and to multiple-cylinder engines, in the following embodiments the engine is a single-cylinder engine in order to facilitate explanation.

Figure 2:
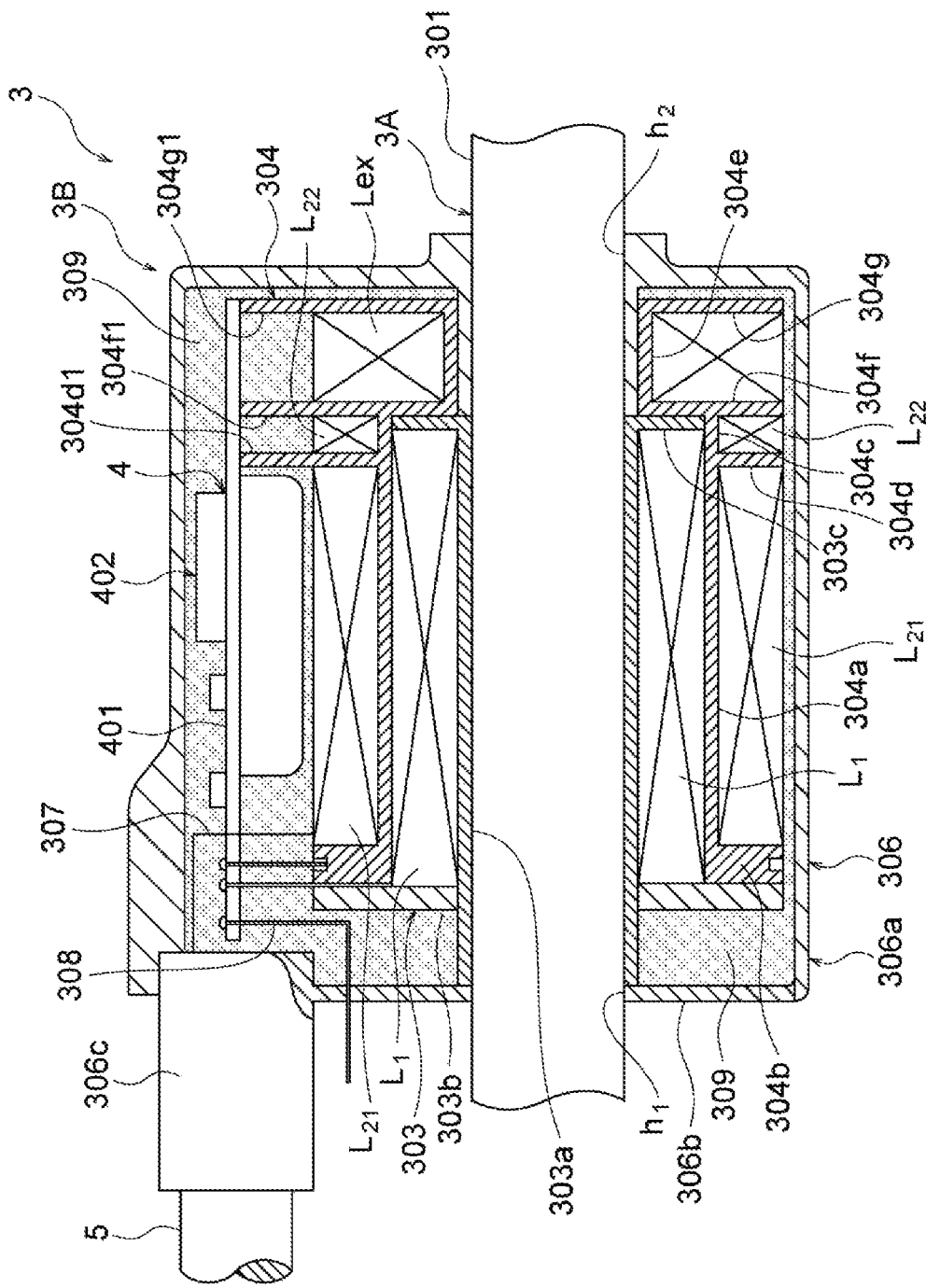
FIG. 2 is a cross-sectional view illustrating configuration of relevant parts of the embodiment of FIG. 1.
Figure 3:
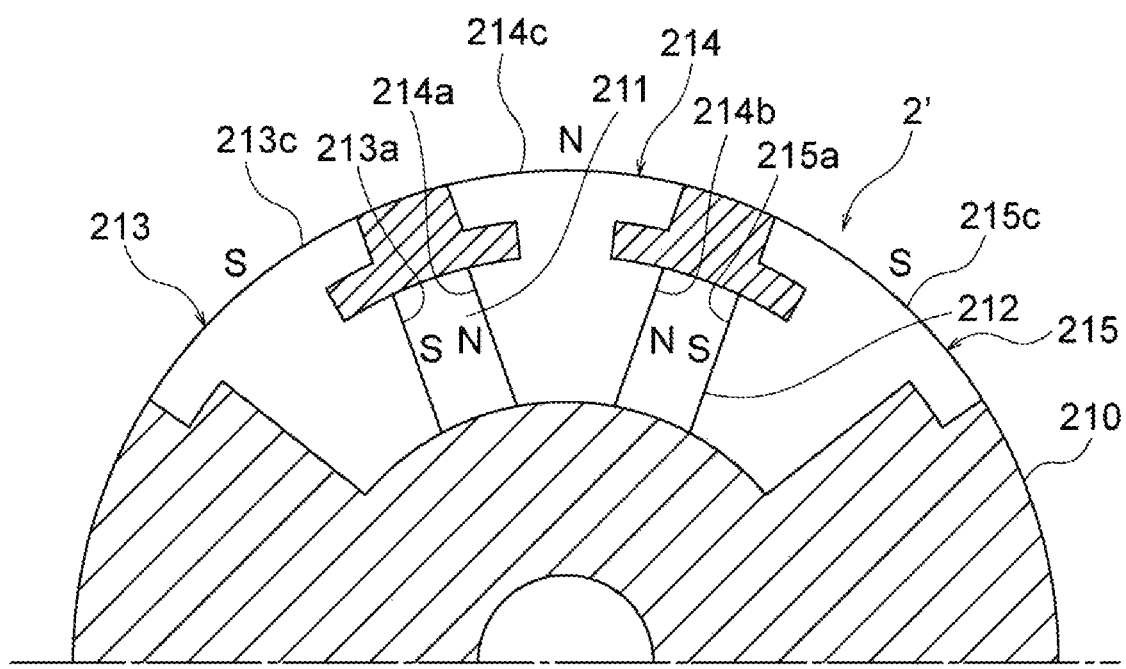
FIG. 3 is a cross-sectional view illustrating half of a modified example of a magneto rotor of a magneto generator that can be used in an embodiment of the present invention.

FIGS. 1 to 4 illustrate an embodiment of an engine ignition device according to the present invention. FIG. 1 is a front view illustrating configuration of relevant parts of a magneto generator used in the present embodiment in partial cross-section. FIG. 2 is an enlarged cross-sectional view illustrating relevant parts of the magneto generator of FIG. 1. FIG. 3 is a cross-sectional view illustrating a modified example of a rotor of a magneto generator that can be used in an ignition device according to the present invention. FIG.

4 is a circuit diagram illustrating a circuit configuration of an engine ignition device according to the present embodiment.

In FIG. 1, 1 is an outer-magnet type magneto generator that is used in the present embodiment. The generator 1 illustrated is configured by a magneto rotor 2 and a stator 3. The magneto rotor 2 is configured by a flywheel 201 that is attached to a crank shaft of an engine (not illustrated), and a permanent magnet 202 that is attached to an outer circumferential part of the flywheel 201. At least the outer circumferential part of the flywheel 201 is configured by a ferromagnetic material such as iron. A recess 203 is formed in the outer circumferential part of the flywheel 201, and an arcuate permanent magnet 202 is attached inside the recess 203 by adhesion or the like. The permanent magnet 202 is magnetized along a radial direction of the flywheel 2. A three-pole magnetic field is configured at the outer circumferential part of the flywheel by three magnetic poles. These three magnetic poles include a magnetic pole (an N pole in the example illustrated) 2b at the outer circumferential side of the permanent magnet 202 and magnetic poles (S poles in the example illustrated) 2a and 2c drawn out from the inner circumferential side of the permanent magnet 202 and onto outer circumferential parts of the flywheel on both sides of the recess 203.

The stator 3 is configured by an armature core 3A and a coil unit 3B that is wound around the armature core 3A. The armature core 3A is a laminated body made of sheet steel, and at each end has magnetic pole parts 3a and 3b that oppose the magnetic poles 2a to 2c of the magnetic field. As described below, in the present embodiment, an electronics unit 4 configuring an engine ignition device is integrally formed to the coil unit 3B.

Described in further detail, the armature core 3A is configured so that an I-shaped coil winding part 301 and a pair of projecting pole units 302a, 302b coupled to both ends of the coil winding part 301 present substantially a U-shape. The magnetic pole parts 3a and 3b are formed at a respective tip of the projecting pole units 302a and 302b. These magnetic pole parts are made to oppose the magnetic poles 2a to 2c of the magnetic field of the magneto rotor 2 across a gap.

As is also illustrated in FIG. 2, the coil unit 3B has a structure in which a primary bobbin 303 that is provided so as to encircle the coil winding part 301 of the armature core 3A, a primary coil $L_1$ of an ignition coil that is wound around the primary bobbin 303, a secondary bobbin 304 that is attached to the armature core in a state in which a main part of the primary bobbin is housed to the inside thereof, a plurality of coils that are wound around the secondary bobbin 304, and the electronics unit 4, which is disposed at an outer side of the coils wound around the secondary bobbin 304, are accommodated within a case 306, and in which the coil unit 3B is molded to components housed within the case 306 using insulating resin 309 that is filled into the case 306. First and second secondary coils $L_{21}$ and $L_{22}$, which configure a secondary coil $L_2$ of the ignition coil, and an exciter coil Lex, are wound around the secondary bobbin 304.

The primary bobbin 303 has a coil winding body part 303a and flange parts 303b and 303c. The flange parts 303b and 303c are respectively provided at one end side and the other end side of the coil winding body part 303a along an axial direction thereof. The primary coil $L_1$ is wound around the outer periphery of the body part 303a.

The secondary bobbin 304 has, integrated together as a single unit, a first coil winding body part 304a, a flange part 304b, a second coil winding body part 304c, a flange part 304d, a third coil winding body part 304e, a flange part 304f, and a flange part 304g. The first coil winding body part 304a is disposed so as to encompass the primary coil $L_1$. The flange part 304b is formed at one axial direction end of the first coil winding body part 304a. The second coil winding body part 304c is formed adjacent to the other axial direction end of the first coil winding body part 304a. The flange part 304d separates the first coil winding body part 304a and the second coil winding body part 304c. The third coil winding body part 304e is provided at a position offset radially inward of the body part 304c at a position adjacent to the second coil winding body part 304c. The flange part 304f separates the second coil winding body part 304c and the third coil winding body part 304e. The flange part 304g is formed to an end of the third coil winding body part 304e on the opposite side of the third coil winding body part 304e to the flange part 304f. The first secondary coil $L_{21}$ and the second secondary coil $L_{22}$ are wound around the first coil winding body part 304a and the second coil winding body part 304c, respectively, and the exciter coil Lex is wound around the third coil winding body part 304e.

Figure 4:
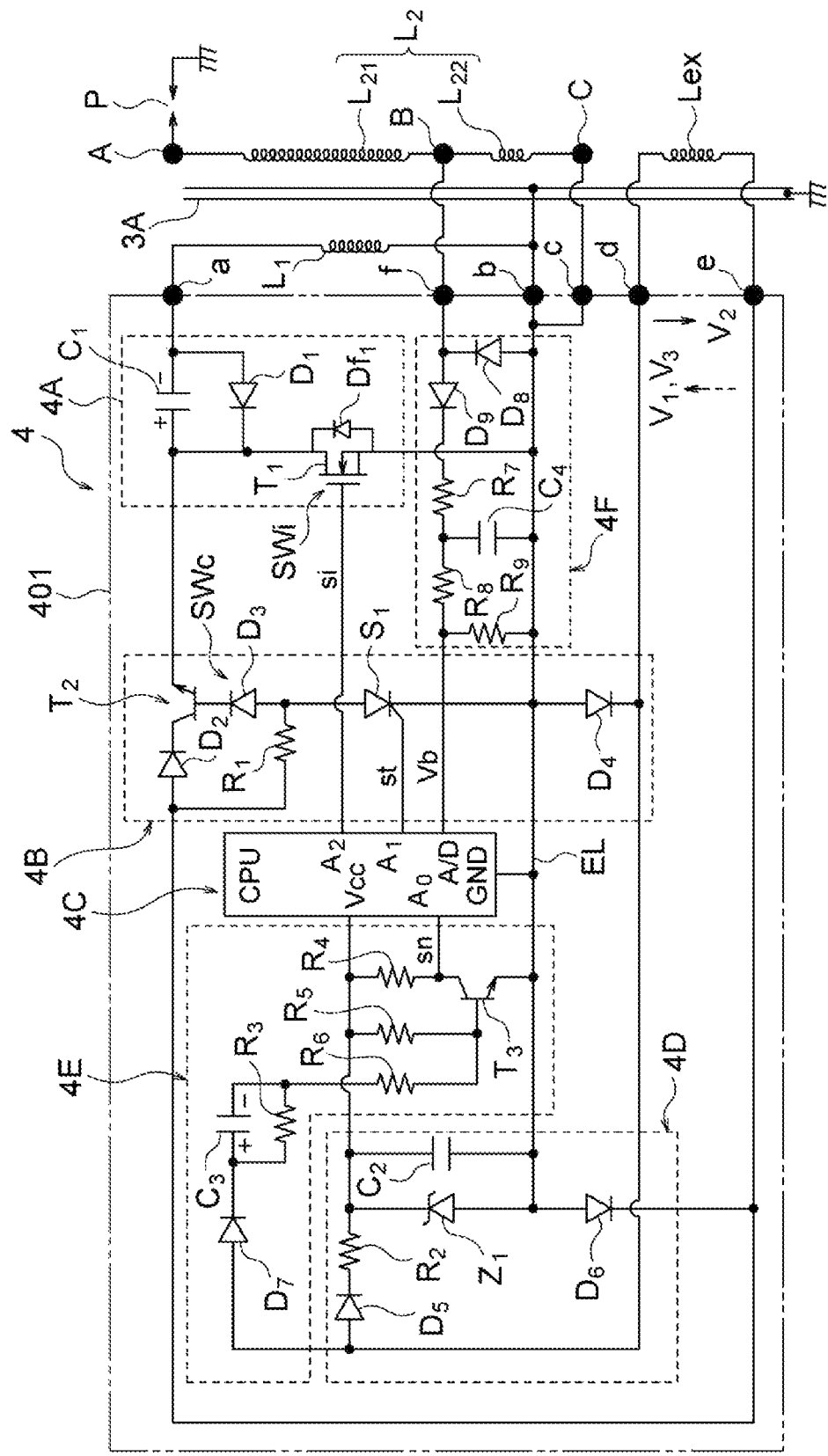
FIG. 4 is a circuit diagram illustrating an example circuit configuration of the ignition device of the embodiment illustrated in FIG. 1.

In the present embodiment, a single conductor is continuously wound to form the first and second secondary coils $L_{21}$ and $L_{22}$. The second secondary coil $L_{22}$ has fewer windings than the first secondary coil $L_{21}$, and as illustrated in FIG. 4, a tap B is led out from a point where the secondary coils are connected. An ungrounded output terminal A of the secondary coil is led out from an end of the first secondary coil $L_{21}$ on the opposite side of the first secondary coil $L_{21}$ to the tap B, and a grounded output terminal C of the secondary coil is led out from an end of the second secondary coil $L_{22}$ on the opposite side of the second secondary coil $L_{22}$ to the tap B.

Although in the example illustrated the exciter coil Lex is wound around the secondary bobbin, the exciter coil can be wound around the primary bobbin.

The electronics unit 4 is configured by mounting electronic components 402 configuring electronic circuitry portion of an engine ignition device to a circuit board 401. The electronics unit 4 is disposed in a state in which a main face (face with the largest surface area) of the circuit board 401 points in a direction following axes of the primary coil $L_1$ and the secondary coil $L_2$. In the example illustrated, projecting parts 304d1, 304f1, and 304g1 that project radially outward are respectively provided to sections of outer peripheral parts of the flange parts 304d, 304f, and 304g of the secondary bobbin 304, and the circuit board 401 is secured to these projecting parts by adhesion or other suitable means, whereby the circuit board 401 is supported with respect to the secondary bobbin 304.

The case 306 has a bottomed case body 306a and a cover plate 306b. The case body 306a houses the primary coil $L_1$ wound around the primary bobbin 303, the secondary coil and the exciter coil wound around the secondary bobbin 304, and the electronics unit 4. The cover plate 306b closes off an opening in the case body 306a. A high-voltage cord retaining part 306c that retains one end of a high-voltage cord 5 is integrally provided to an outer peripheral part of the cover plate 306b. An output line 307 led out from the ungrounded output terminal A (see FIG. 4) of the secondary coil $L_2$ of the ignition coil is connected to one end of a core of the high-voltage cord 5 retained by the high-voltage cord retaining part 306c. The other end of the core of the high-voltage cord 5 is connected to an ungrounded terminal of an ignition plug attached to the cylinder of the engine. An earth lead 308 is drawn out from an earth terminal of the circuit board 401. This earth lead passes through the cover plate 306b of the case and leads to the outside. The insulating resin 309 is filled into the case 306, and this insulating resin is molded around components housed the case 306.

The armature core 3A is disposed in a state in which the coil winding part 301 has been passed through an iron-core through hole $h_1$ provided in the cover plate 306b, the coil winding body part 303a of the primary bobbin 303, the third coil winding body part 304e of the secondary bobbin 304, and an iron-core through hole $h_2$ provided in a bottom part of the case body 306a. The armature core 3A and the coil unit 3B configure the stator 3.

Although in the present embodiment the engine is a single-cylinder engine, in cases in which the engine is a multiple-cylinder engine, a stator 3 is provided to each cylinder of the engine, and in each cylinder, an ignition operation is performed when the magnetic pole parts 2a to 2c of the magneto rotor 2 pass by the positions of the magnetic pole parts 3a and 3b of the stator 3 provided to each cylinder. Each stator 3 is disposed at a position suited to cause an ignition operation to be performed in the corresponding cylinder, and is secured to a stator attachment part provided to a case or the like of the engine.

In the example illustrated in FIG. 1, attachment holes 302a1 and 302b1 are respectively provided passing through the projecting pole units 302a, 302b of the armature core. The stator 3 is fastened to a stator attachment part by screws respectively passed through these attachment holes. In a state in which the stator 3 has been secured to the stator attachment part, the magnetic pole parts 3a and 3b formed at the tips of the projecting pole units 302a and 302b are made to oppose a region provided with the magnetic poles 2a to 2c at the outer circumferential part of the magneto rotor 2 across a gap.

In the magneto generator used in the present embodiment, due to the exciter coil Lex and the primary coil $L_1$ and the secondary coil $L_2$ of the ignition coil being wrapped around the armature core 3A, not only is an output voltage of the magneto generator voltage induced in the exciter coil Lex, but an output voltage of the magneto generator is induced in the primary coil $L_1$ and the secondary coil $L_2$ of the ignition coil as well.

In the illustrated magneto generator, over the course of a single rotation by the magneto rotor 2, changes such as that illustrated in FIG. 9(A) arise in magnetic flux φ flowing through the armature core 3A. As illustrated in FIG. 9(B), this change in magnetic flux sequentially induces, in the exciter coil Lex, a first half-wave voltage $V_1$, a second half-wave voltage $V_2$ of an opposite polarity to that of the first half-wave voltage $V_1$, and a third half-wave voltage $V_3$ of the same polarity as the first half-wave voltage $V_1$. Voltage having a waveform made up of first to third half-wave voltages similar to the voltage induced in the exciter coil Lex is also induced in the primary coil $L_1$ and the secondary coil $L_2$ of the ignition coil.

Figure 9:
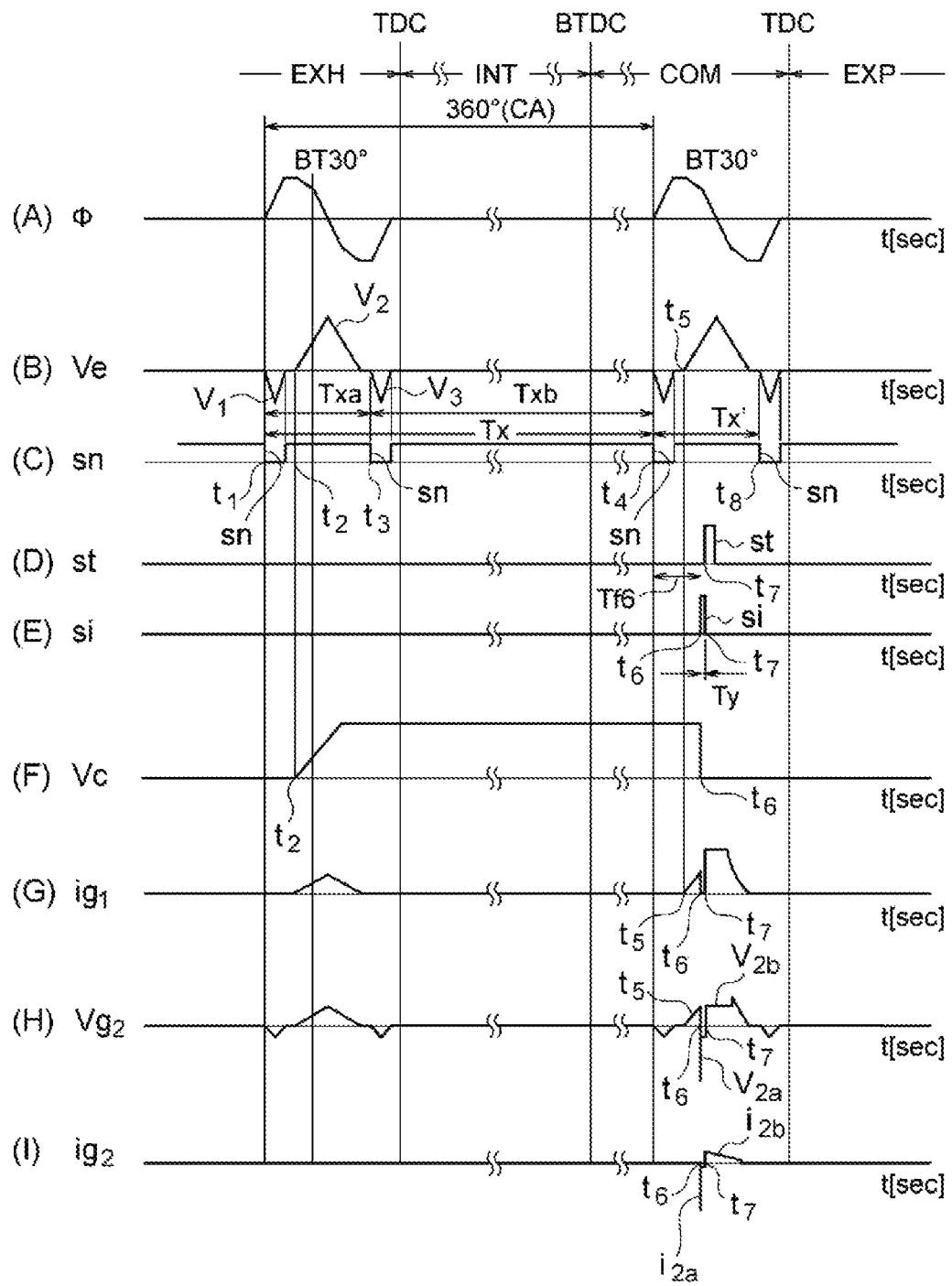
FIG. 9 is a timing chart for explaining operation of the embodiment illustrated in FIG. 4.

Although in the example illustrated in FIG. 9 the first half-wave voltage $V_1$ and the third half-wave voltage $V_3$ induced in the exciter coil Lex are depicted made up of negative voltages and the second half-wave voltage $V_2$ is depicted made up of positive voltage, by reversing a winding direction of the exciter coil, the first half-wave voltage $V_1$ and the third half-wave voltage $V_3$ can be made positive voltages and the second half-wave voltage $V_2$ can be made a negative voltage. Similar applies to the voltage induced in the primary coil and the secondary coil of the ignition coil.

In the present embodiment, the exciter coil Lex is wound in the same direction as the primary coil $L_1$ of the ignition coil. Consequently, accompanied with rotation of the crank shaft, voltages that are in phase with one another are induced in the exciter coil Lex and the primary coil $L_1$. The winding direction of the secondary coil $L_2$ of the ignition coil may be freely chosen. In the present embodiment, the winding direction of the secondary coil $L_2$ is set so as to induce a voltage in the secondary coil $L_2$ that is in phase with the voltage induced in the exciter coil Lex.

In the example illustrated in FIG. 1, at least the outer circumferential part of the flywheel 201 attached to the crank shaft of the engine is formed from a ferromagnetic material and the permanent magnet 202 is attached inside the recess 203 provided in the outer circumferential part of the flywheel 201 to configure the magnetic field of the rotor. However, the configuration of the magneto generator is not limited to the example illustrated in FIG. 1.

For example, in cases in which the magneto generator is configured as an outer-magnet type magneto generator in a manner similar to in the example illustrated in FIG. 1, a magneto rotor 2' configured such as illustrated in FIG. 3 can be used. The magneto rotor 2' illustrated in FIG. 3 is configured by a flywheel 210 made of a non-magnetic material such as aluminum, a pair of permanent magnets 211, 212 that are embedded in the flywheel 210, and magnetic pole configuration members 213 to 215 that together with the permanent magnets 211, 212 draw magnetic poles of the permanent magnets 211, 212 embedded in the flywheel 210 out onto the outer circumference of the flywheel. The magnetic pole configuration members 213 to 215 are configured by laminated bodies made of sheet steel, and are formed in shapes having side faces (sheet steel lamination faces) that are disposed spaced apart by a prescribed distance in a circumferential direction of the flywheel 210 and outer circumferential faces (sheet steel lamination faces) that have the same radius of curvature as the outer circumferential face of the flywheel.

The permanent magnets 211, 212 are made of sheet-shaped magnets that have been magnetized along thickness directions thereof. The permanent magnets 211, 212 are disposed in a state in which magnetic poles of one polarity (in the example illustrated, N poles) of each magnet opposes one another in the circumferential direction of the flywheel 210 (in a state spaced apart by a prescribed distance in the circumferential direction of the flywheel) and are embedded in the flywheel. The magnetic pole configuration member 213 is disposed in a state in which one side face 213a lies against a magnetic pole of the other polarity (in the example illustrated, an S pole) of the permanent magnet 211 and an outer circumferential face 213c is exposed at the outer circumference of the flywheel 210. The magnetic pole configuration member 213 draws a magnetic pole of the other polarity (an S pole) of the permanent magnet 211 out onto the outer circumference of the flywheel.

The magnetic pole configuration member 214 is embedded in the flywheel 210 in a state disposed between the permanent magnets 211, 212 with both side faces 214a, 214b lying against the magnetic poles of the one polarity (N poles) of the magnets 211, 212 and in which an outer circumferential face 214c is exposed at the outer circumference of the flywheel 210. The magnetic pole configuration member 214 draws a magnetic pole of the one polarity (in the example illustrated, an N pole) of the permanent magnets 211, 212 out onto the outer circumference of the flywheel.

The magnetic pole configuration member 215 is embedded in the flywheel in a state in which one side face 215a lies against a magnetic pole of the other polarity (in the example illustrated, an S pole) of the permanent magnet 212 and an outer circumferential face 215c is exposed at the outer circumference of the flywheel. The magnetic pole configuration member 215 draws a magnetic pole of the other polarity (in the example illustrated, an S pole) of the permanent magnet 212 out onto the outer circumference of the flywheel 210. At the outer circumferential part of the flywheel 210, three magnetic poles are configured by the outer circumferential faces of the magnetic pole configuration members 213 to 215.

<Example Circuit Configuration of the Ignition Device of the Present Embodiment>

Next, electrical configuration of the engine ignition device of the present embodiment will be described with reference to FIG. 4.

In FIG. 4, $L_1$ and $L_2$ are the primary coil and the secondary coil, respectively, of an ignition coil IG, Lex is the exciter coil, and as previously stated, these are all provided in the magneto generator 1 driven by the engine. In the present embodiment, one end of the primary coil $L_1$ of the ignition coil is connected to the armature core 3 A and grounded, and the primary coil $L_1$ and the exciter coil Lex are connected to the electronics unit 4.

The electronics unit 4 illustrated in FIG. 4 is configured from an ignition circuit 4A, a charging circuit 4B, a microcomputer 4C which controls ignition circuit 4A and charging circuit 4B, a power supply circuit 4D which provides a power supply voltage to the microcomputer 4C and the like, a rotation detection circuit 4E, and a breakdown voltage detection circuit 4F. The rotation detection circuit 4E detects a specific feature in a waveform of voltage induced in the exciter coil Lex and outputs a plurality of rotation detection signals which include a rotation detection signal generated at a reference position set at a position coming before a crank angle position coming when a piston of the engine reaches top dead center.

Described in further detail, the ignition circuit 4A includes an ignition capacitor $C_1$, a damper diode $D_1$, and an ignition switch SWi. One end of the ignition capacitor $C_1$ is connected to the other end of the primary coil $L_1$ of the ignition coil. The damper diode $D_1$ is connected, in parallel, across both ends of the ignition capacitor $C_1$ in a state in which an anode of the damper diode D1 is pointed toward the one end of the primary coil $L_1$. The ignition switch SWi is provided so as to connect the other end of the ignition capacitor $C_1$ and the other end of the primary coil $L_1$. In the example illustrated, the ignition switch SWi is configured by a MOSFET $T_1$. A drain of the MOSFET $T_1$ is connected to the other end of the ignition capacitor $C_1$, and a source of the MOSFET $T_1$ is connected to the other end of the primary coil $L_1$. When a drive signal is being provided to a gate of the MOSFET $T_1$, the ignition switch SWi assumes an ON state. A parasitic diode $Df_1$ is formed between the drain and the source of the MOSFET $T_1$ configuring the ignition switch SWi.

The charging circuit 4B is configured by an NPN transistor $T_2$, a diode $D_2$, a diode $D_3$, a resistor $R_1$, a thyristor $S_1$, and a diode $D_4$. An emitter of the transistor $T_2$ is connected to the other end of the ignition capacitor $C_1$. A cathode of the diode $D_2$ is connected to a collector of the transistor $T_2$, and an anode of the diode $D_2$ is connected to one end of the exciter coil Lex. A cathode of the diode $D_3$ is connected to a base of the transistor $T_2$. The resistor $R_1$ is connected between the anode of the diode $D_2$ and an anode of the diode $D_3$. An anode of the thyristor $S_1$ is connected to the anode of the diode $D_3$, and a cathode of the thyristor $S_1$ is connected to an earth line EL provided to the circuit board. An anode of the diode $D_4$ is connected to the earth line EL (to the cathode of the thyristor $S_1$), and a cathode of the diode $D_4$ is connected to another end of the exciter coil Lex.

In the example illustrated, a charging switch SWc is configured by the transistor $T_2$, the resistor $R_1$, and the diodes $D_2$, $D_3$, and a turn-OFF circuit that turns the charging switch SWc OFF is configured by the thyristor $S_1$. When a second half-wave voltage $V_2$ in the direction of the arrow in the figure is generated in the exciter coil Lex, a base current is provided to the transistor $T_2$ configuring the charging switch SWc and the transistor $T_2$ assumes an ON state, and when a trigger signal is provided to a gate of the thyristor $S_1$ and the thyristor $S_1$ assumes an ON state, the base current passes through the thyristor $S_1$ bypassing the transistor $T_2$, whereby the transistor $T_2$ assumes an OFF state.

The microcomputer 4C is provided with a power supply terminal Vcc, ports $A_0$ to $A_2$, an analog signal input terminal A/D, and a CPU that has an earth terminal GND. A trigger signal st is provided to the gate of the thyristor $S_1$ from port $A_1$ of the CPU, and a drive signal (ignition signal) si is provided to the gate of the MOSFET $T_1$ from port $A_2$ of the CPU. The earth terminal GND of the CPU is connected to the earth line EL provided to the circuit board.

The power supply circuit 4D is configured by a diode $D_5$, a power supply capacitor $C_2$, a Zener diode $Z_1$, and a diode $D_6$. An anode of the diode $D_5$ is connected to the other end of the exciter coil Lex. One end of the power supply capacitor $C_2$ is connected to a cathode of the diode $D_5$ through a resistor $R_2$, and the other end of the power supply capacitor $C_2$ is connected to the earth line EL. The Zener diode $Z_1$ is connected, in parallel, across both ends of this capacitor, with the anode of the Zener diode $Z_1$ pointed toward the earth line. An anode of the diode $D_6$ is connected to the earth line EL, and a cathode of the diode $D_6$ is connected to the other end of the exciter coil Lex. The power supply circuit 4D outputs a constant (for example, 5 V) control DC voltage that is determined by a Zener voltage of the Zener diode $Z_1$ as seen from both ends of the power supply capacitor $C_2$. A DC voltage yielded by the power supply circuit 4D is applied across the power supply terminal Vcc and the earth terminal GND of the CPU of the microcomputer 4C.

The rotation detection circuit 4E includes a diode $D_7$, a capacitor $C_3$, a resistor $R_3$, an NPN transistor $T_3$, a resistor $R_5$, and a resistor $R_6$. An anode of the diode $D_7$ is connected to the other end of the exciter coil Lex. One end of the capacitor $C_3$ is connected to a cathode of the diode $D_7$. The resistor $R_3$ is connected, in parallel, across both ends of the capacitor $C_3$. An emitter of the transistor $T_3$ is connected to the earth line EL, and a collector of the transistor $T_3$ is connected to an ungrounded output terminal of the power supply circuit 4D through the resistor $R_4$. The resistor $R_5$ is connected between a base of the transistor $T_3$ and the ungrounded output terminal of the power supply circuit 4D. The resistor $R_6$ is connected between the base of the transistor $T_3$ and another end of the capacitor $C_3$. The collector (output terminal of the rotation detection circuit) of the transistor $T_3$ is connected to port $A_0$ of the CPU.

In the illustrated rotation detection circuit 4E, an integrating circuit is configured by the capacitor $C_3$ and resistors $R_3$ and $R_6$. The circuit constant of the integrating circuit is set so that once the capacitor $C_3$ has been charged to the illustrated polarity by a first half-wave voltage $V_1$ and a third half-wave voltage $V_3$ in the direction of the dashed arrow in the figure from the exciter coil Lex, a constant, very small voltage subsequently remains across both ends of the capacitor $C_3$. When the first half-wave voltage $V_1$ and the third half-wave voltage $V_3$ induced in the exciter coil Lex exceed the voltage across both ends of the capacitor $C_3$, a base current flows to transistor $T_3$, the transistor $T_3$ assumes the ON state, and an electric potential at the collector of the transistor $T_3$ is reduced in a stepwise manner. Because base current ceases to flow to the transistor $T_3$ when the first half-wave voltage $V_1$ and the third half-wave voltage $V_3$ are less than or equal to the voltage across both ends of the capacitor $C_3$, the transistor $T_3$ assumes the OFF state, and the electric potential at the collector of the transistor $T_3$ is increased in a stepwise manner. The integrating circuit is provided in order to prevent the transistor $T_3$ from assuming the ON state and generating an erroneous signal due to noise.

As illustrated in FIG. 9(C), between the collector and the emitter of the transistor $T_3$ of the rotation detection circuit 4E, there is obtained a pulse waveform signal that falls from the power supply voltage in a stepwise manner when the first half-wave voltage $V_1$ rises and when the third half-wave voltage $V_3$ rises, and that rises to the power supply voltage in a stepwise manner when the first half-wave voltage $V_1$ falls and the third half-wave voltage $V_3$ falls. Each falling edge of this signal is recognized as a rotation detection signal sn by the CPU.

The rotation detection circuit 4E used in the present embodiment generates a rotation detection signal sn at two crank angle positions during one rotation of the crank shaft: a crank angle position where a first half-wave voltage $V_1$ generated by the exciter coil Lex rises, and a crank angle position where a third half-wave voltage $V_3$ generated by the exciter coil Lex rises. In the present embodiment, of these crank angle positions, the crank angle position where a first half-wave voltage $V_1$ rises is used as a reference position when detecting an ignition timing, and the rotation detection signal sn generated at this reference position is used as a reference signal. Each time the CPU recognizes a rotation detection signal sn, the CPU performs a process that identifies whether or not the rotation detection signal sn that was just generated is a reference signal, and when the rotation detection signal sn that was just generated is identified as being reference signal, the CPU calculates, as a count time used for ignition timing detection Tig, the amount of time needed for the crank shaft to rotate from the reference position to an ignition position at the current speed of the crank shaft. The CPU counts down the count time used for ignition timing detection Tig with a timer, and when the timer has finished counting down, the CPU provides a drive signal to the ignition switch SWi.

The breakdown voltage detection circuit 4F includes a diode $D_8$, a diode $D_9$, a capacitor $C_4$, and a resistor $R_9$. The diode $D_8$ is connected between the earth line EL and the tap B led out from a point where the first secondary coil $L_{21}$ and the second secondary coil $L_{22}$ is connected, with an anode of the diode $D_8$ being pointed toward the earth line. An anode of the diode $D_9$ is connected to the tap B. One end of the capacitor $C_4$ is connected to a cathode of the diode $D_9$ through a resistor $R_7$, and another end of the capacitor $C_4$ is connected to the earth line EL. The resistor $R_9$ is connected, in parallel, across both ends of the capacitor $C_4$ through a resistor $R_8$.

The breakdown voltage detection circuit 4F generates, across both ends of the resistor $R_9$, a DC voltage signal Vb that is substantially equivalent to a peak value of a voltage that appears across both ends of the second secondary coil $L_{22}$ of the ignition coil. The voltage signal Vb is inputted to the analog signal input terminal A/D of the CPU as a dielectric breakdown voltage detection signal. The CPU of the microcomputer 4C detects, as a voltage (breakdown voltage) across a discharge gap of the ignition plug in a state in which insulation thereacross has been broken down, a voltage signal Vb that is detected across both ends of the second secondary coil $L_{22}$ when a first spark discharge is produced in the ignition plug as a result of a high voltage used for ignition induced in the secondary coil of the ignition coil by discharging the ignition capacitor $C_1$. The breakdown voltage takes on a low value when the stroke of the engine is an exhaust stroke and pressure in the cylinder is low, and the dielectric breakdown voltage takes on a high value when the stroke of the engine is a compression stroke and pressure in the cylinder is high.

Electronic components configuring the electronics unit 4 illustrated in FIG. 4 are mounted to the circuit board 401. One end of the circuit board is provided with a terminal electrode a, terminal electrodes b and c, a terminal electrode d, a terminal electrode e, and a terminal electrode f. The terminal electrode a is connected to the one end of the ignition capacitor $C_1$. The terminal electrodes b and c are connected to the earth line EL. The terminal electrode d is connected to the cathode of the diode $D_4$. The terminal electrode e is connected to the cathode of the diode $D_6$. The terminal electrode f is connected to the anode of the diode $D_9$. When the stator 3 of the magneto generator is assembled, the terminal electrodes b and c are respectively connected to the armature core 3A and a ground terminal C of the secondary coil, these being parts at a ground potential. The primary coil $L_1$ of the ignition coil is connected between the terminal electrode a and the terminal electrode b, and the exciter coil Lex is connected between the terminal electrode d and the terminal electrode e. The ungrounded terminal A of the secondary coil $L_2$ of the ignition coil is connected to the ungrounded terminal of the ignition plug P through a high-voltage cord.

Figure 7:
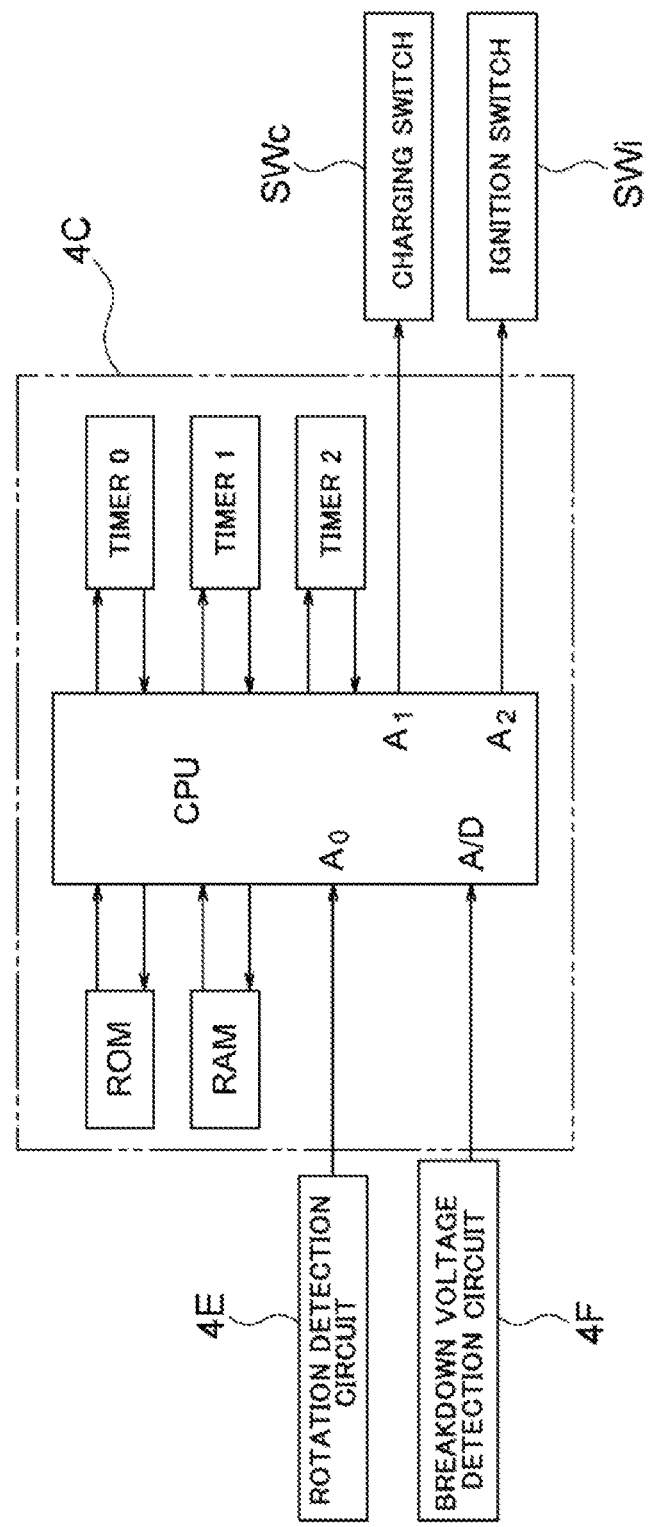
FIG. 7 is a block diagram illustrating configuration of a microcomputer used in the present embodiment.

The ignition device illustrated in FIG. 4 is controlled by executing a prescribed program using the CPU of the microcomputer 4C. As illustrated in FIG. 7, in addition to the CPU, ROM, and RAM, the microcomputer 4C is provided with a timer 0, a timer 1, and a timer 2. Output from the rotation detection circuit 4E is inputted to port $A_0$ of the CPU, and output from the breakdown voltage detection circuit 4F is inputted to the analog signal input terminal A/D of the CPU. Trigger signals are provided from port $A_1$ of the CPU to the thyristor $S_1$ configuring the circuit that turns the charging switch SWc OFF, and drive signals are provided from port $A_2$ of the CPU to the gate of the MOSFET $T_1$ configuring the ignition switch SWi.

Of the timers 0 to 2, timer 0 is used in order to count down a time Ty for insulation across the discharge gap of the ignition plug P to reach a broken down state after a drive signal has been provided to the ignition switch SWi at an ignition timing, and timer 1 is used in order to count down a time Tig for detecting an ignition timing.

Timer 2 counts time between when rotation detection signals sn are generated by the rotation detection circuit 4E. Timer 2 is controlled by the CPU so as to repeatedly reset and resume a timing operation each time a rotation detection signal sn is generated. As illustrated in FIG. 9(C), using a count value from timer 2 read immediately before resetting timer 2, the CPU detects a time Txa from when a rotation detection signal sn is generated at a rising edge of a first half-wave voltage $V_1$ outputted by the exciter coil to when a rotation detection signal sn is generated at a rising edge of a third half-wave voltage $V_3$ outputted by the exciter coil, and the CPU detects a time Txb from when a rotation detection signal sn is generated at a rising edge of the third half-wave voltage $V_3$ to when a rotation detection signal sn is generated at a rising edge of the next first half-wave voltage $V_1$.

<Functional Means Configured by the CPU>

The microcomputer 4C configures various functional means by executing a prescribed program stored in the ROM using the CPU. In order to implement the ignition method of the present invention, the microcomputer 4C performs control of the charging switch SWc that flows a charging current to the ignition capacitor $C_1$ and performs control of the ignition switch SWi that discharges the ignition capacitor $C_1$.

Figure 8:
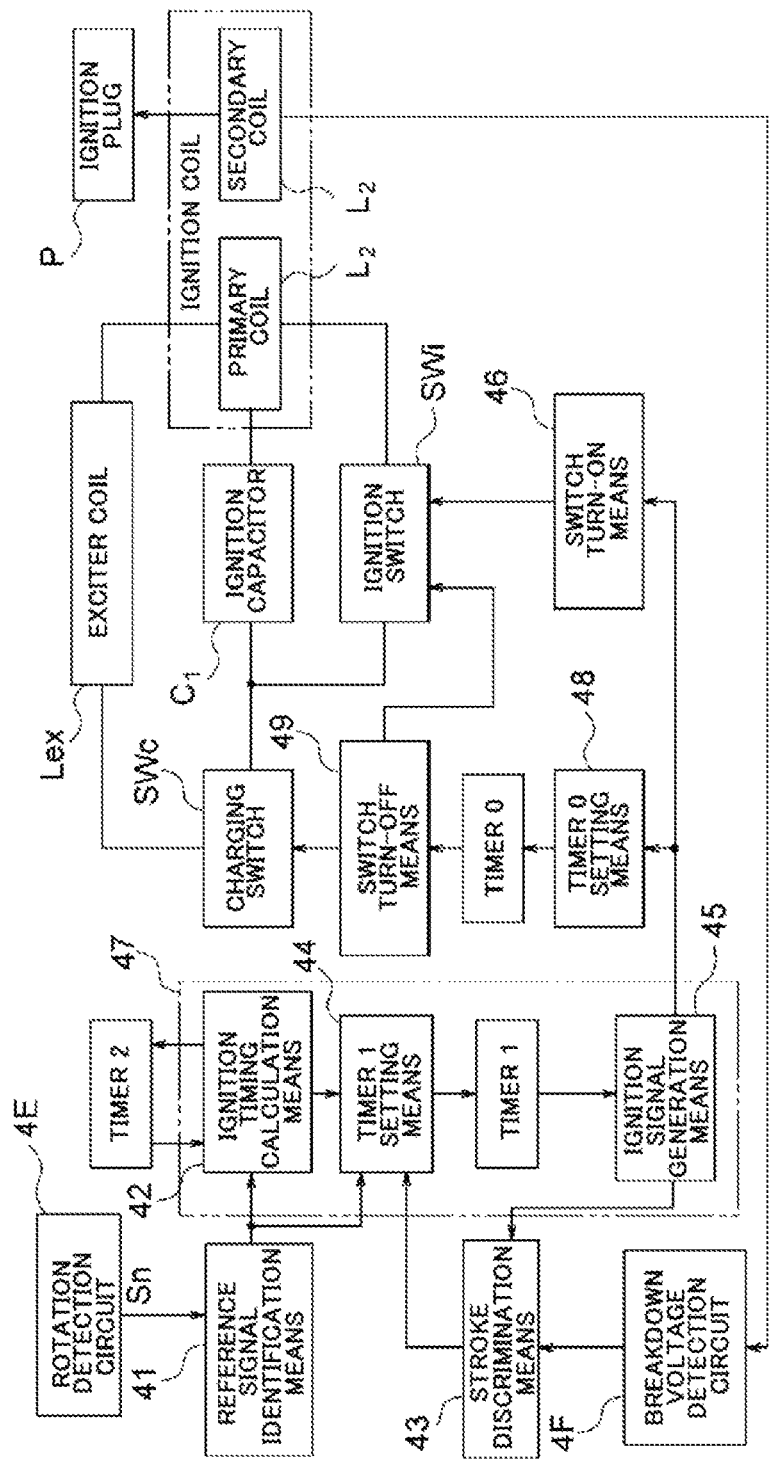
FIG. 8 is a block diagram illustrating configuration of a control unit used in the present embodiment.

FIG. 8 is a block diagram that uses various functional means configured by the microcomputer 4C to express a configuration of the ignition device of FIG. 4. In the present embodiment, the CPU executes the prescribed program stored in the ROM, and thereby configures a reference signal identification means 41, an ignition timing calculation means 42, a stroke discrimination means 43, a timer 1 setting means 44, an ignition signal generation means 45, a switch turn-ON means 46, a timer 0 setting means 48, and a switch turn-OFF means 49.

In FIG. 8, the reference signal identification means 41 reads a count value from timer 2 each time a rotation detection signal sn is generated by the rotation detection circuit 4E, and when the count value from timer 2 that was just read is greater than the count value from timer 2 read when a rotation detection signal was last generated, the reference signal identification means 41 identifies the rotation detection signal that was just generated as a reference signal generated at a rising edge of a first half-wave voltage. The reference signal identification means 41, for example, identifies a rotation detection signal sn read at moment $t_4$ in FIG. 9(C) as a reference signal due to the count value Txb read at moment $t_4$ being larger than the count value Txa that was last read before that. A reference signal is generated only once during one rotation of the crank shaft. In the present embodiment, the crank angle position when the reference signal is generated is used as a reference position at which timer 1 is caused to begin counting down a count time used for ignition timing detection Tig.

The ignition timing calculation means 42 detects a time Tx (=Txa+Txb) needed for the crank shaft make one rotation based on a count value from timer 2, which repeatedly resets and resumes a timing operation each time a rotation detection signal is detected, determines an angle θx from a crank angle position (reference position) where a reference signal is detected to a crank angle position where ignition of the engine is performed using information relating to engine speed obtained from this time Tx, and calculates, as a count time used for ignition timing detection Tig, the amount of time needed for the crank shaft to rotate the angle θx from the reference position at the current speed of the crank shaft.

The stroke discrimination means 43 makes use of the fact that the breakdown voltage (voltage across the discharge gap of the ignition plug in a state that insulation across the discharge gap is broken down) detected through the breakdown voltage detection circuit 4F from partway along the secondary coil $L_2$ when a first spark discharge is produced in the ignition plug as a result of a high voltage induced in the secondary coil of the ignition coil by discharging the ignition capacitor $C_1$ when the ignition switch SWi is placed into the ON state differs between when the stroke of the engine is an exhaust stroke and when the stroke of the engine is a compression stroke, and thereby discriminates whether a stroke of the engine is an exhaust stroke or a compression stroke when each reference signal is generated.

Because the breakdown voltage of the discharge gap of the ignition plug when the stroke of the engine is a compression stroke is higher than the breakdown voltage when the stroke of the engine is an exhaust stroke, it is possible to discriminate whether a stroke for which a reference signal has been detected is a compression stroke or an exhaust stroke by performing a voltage determination procedure that compares the breakdown voltage detected when a first spark discharge is produced in the ignition plug at an ignition timing with the breakdown voltage detected when a first spark discharge was produced in the ignition plug at the previous ignition timing.

In order to reliably discriminate between strokes, it is preferable that the stroke discrimination means 43 be configured so as to ultimately determine whether a stroke for which a reference signal has been detected is a compression stroke or an exhaust stroke based on results from performing the aforementioned voltage determination procedure multiple times. In cases in which the engine is a four-cycle engine, the detection of a reference signal generated in a compression stroke and the detection of a reference signal generated in an exhaust stroke are alternatingly performed in accompaniment with rotation of the crank shaft. Thus, if stroke discrimination by the stroke discrimination means 43 is performed immediately after starting the engine, stroke discrimination can be performed in a mechanical manner thereafter.

The timer 1 setting means 44 sets a count time Tig used for ignition timing detection to timer 1 and causes timer 1 to begin counting down the time Tig set thereto. Immediately after starting the engine, when the stroke discrimination means 43 is in a state in which stroke discrimination is not yet finished, each time a reference signal is generated and the ignition timing calculation means 42 calculates a count time Tig used for ignition timing detection, the timer 1 setting means 44 sets this count value Tig to timer 1 and causes timer 1 to begin counting down, and after the stroke discrimination means 43 has finished the stroke discrimination, the timer 1 setting means 44 sets a count value used for ignition timing detection Tig to timer 1 and causes timer 1 to begin counting down only in cases in which stroke of the engine when a reference signal has been generated is a compression stroke.

The ignition signal generation means 45 generates an ignition signal when timer 1 has finished counting down a count value Tig set thereto, and the switch turn-ON means 46 provides a drive signal to the MOSFET $T_1$ and places the ignition switch SWi into the ON state when an ignition signal is generated.

In the present embodiment, the ignition timing calculation means 42, the timer 1 setting means 44, timer 1, and the ignition signal generation means 45 configure an ignition timing detection means 47 that generates an ignition signal when an ignition timing of the engine is detected.

The timer 0 setting means 48 sets a preset time Ty to timer 0 and causes timer 0 to begin counting down. The time Ty is the time until a first spark discharge is produced across the discharge gap of the ignition plug and the insulation across the discharge gap of the ignition plug reaches a broken down state after an ignition signal has been provided to the ignition switch SWi. The time Ty is set to an appropriate value ahead of time on the basis of a result of tests that count an amount of time until a first spark discharge is produced in the ignition plug after an ignition signal has been provided to the ignition switch SWi.

The switch turn-OFF means 49 places the ignition switch SWi and the charging switch SWc into the OFF state when timer 0 has finished counting down a time Ty set thereto. When timer 0 has finished counting down a time Ty set thereto, the switch turn-OFF means 49 places the MOSFET $T_1$ into the OFF state by removing the drive signal that had been provided to the MOSFET $T_1$ and places the transistor $T_2$ in the OFF state by providing a trigger signal to the thyristor $S_1$. Thereby, in a state in which current does not flow to the primary coil $L_1$ of the ignition coil and the exciter coil Lex and the occurrence of armature reaction in the magneto generator is prevented, a voltage induced in the secondary coil of the ignition coil due to a change in magnetic flux inputted to the armature core from the magneto rotor is applied to the ignition plug P in a state in which the insulation across the discharge gap has been broken down due to a first spark discharge, and a second spark discharge is produced in the ignition plug P.

<Operation of the Ignition Device of the Present Embodiment>

Operation of the ignition device illustrated in FIG. 4 will now be described with reference to FIG. 9. FIG. 9 is a timing chart illustrating operation of the present embodiment in a state after engine stroke discrimination has finished. The horizontal axis in FIG. 9 indicates time t (sec). The symbols EXH, INT, COM, and EXP shown in the upper part of FIG. 9 respectively indicate when the stroke of the engine is an exhaust stroke, an intake stroke, a compression stroke, and a power stroke. Further, the "(CA)" in "360° (CA)" means crank angle, and TDC and BTDC respectively indicate a top dead center and a bottom dead center of the piston.

FIG. 9(A) illustrates changes in magnetic flux φ produced in the armature core accompanying rotation of the magneto rotor. FIG. 9(B) illustrates a waveform of voltage induced in the exciter coil Lex accompanied with changes in the magnetic flux φ when under no load. Due to this change in the magnetic flux φ, the exciter coil generates a voltage having an AC waveform in which a first half-wave voltage $V_1$, a second half-wave voltage $V_2$ of a different polarity to that of the first half-wave voltage, and a third half-wave voltage $V_3$ of the same polarity as the first half-wave voltage $V_1$ sequentially appear at a position coming before a top dead center position (a crank angle position coming when the piston reaches top dead center) of an exhaust stroke and at a position coming before the top dead center position of a compression stroke. These voltages appear one time each during one rotation of the crank shaft. The positions at which the exciter coil generates voltage can be adjusted, as appropriate, according to a position where the stator is attached to the magneto generator.

In the ignition device illustrated in FIG. 4, a base current is provided to the transistor $T_2$ when the exciter coil Lex generates a second half-wave voltage $V_2$ and this transistor assumes the ON state. Accordingly, while the exciter coil Lex is generating a second half-wave voltage $V_2$, the ignition capacitor $C_1$ is charged to the illustrated polarity through the route: exciter coil Lex→diode $D_2$→transistor $T_2$→ignition capacitor $C_1$→primary coil $L_1$→diode $D_4$→exciter coil Lex, and the voltage Vc across both ends of the ignition capacitor $C_1$ changes as in FIG. 9(F).

When the exciter coil Lex generates voltage, a signal with a waveform such as illustrated in FIG. 9(C) is inputted to the CPU from the rotation detection circuit 4E. Of the signal provided from the rotation detection circuit 4E, the CPU respectively recognizes falling edges that occur at moments $t_1$, $t_4$, . . . and falling edges that occur at moments $t_3$, $t_8$, . . . as rotation detection signals sn, and of these rotation detection signals, the CPU identifies the rotation detection signals sn occurring when a first half-wave voltage $V_1$ rises at moments $t_1$, $t_4$, . . . as reference signals.

When the engine stroke discrimination is finished, the CPU sets a count time used for ignition timing detection Tig to timer 1 and causes timer 1 to begin counting down when a reference signal is generated at moment $t_4$ in a compression stroke of the engine, and the CPU generates an ignition signal si and places the ignition switch (MOSFET $T_1$) in the ON state when timer 1 finishes counting down the time Tig at moment $t_6$. This discharges electric charge accumulated by the ignition capacitor C1 through the route: ignition capacitor $C_1$→MOSFET $T_1$→primary coil $L_1$→ignition capacitor $C_1$. This discharge induces a high voltage used for ignition in the secondary coil $L_2$ of the ignition coil and produces a first spark discharge in the ignition plug P.

After the ignition capacitor $C_1$ has been discharged, the CPU terminates the ignition signal si at time $t_7$ (see FIG. 9E), which is when the extremely small amount of moment Ty, which is from when a first spark discharge was produced to when the insulation across the discharge gap of the ignition plug reaches a broken down state, has elapsed, and the CPU stops suppling a drive signal to the MOSFET $T_1$ (ignition switch), whereby at the same time as placing the MOSFET $T_1$ in the OFF state and preventing current flow to the primary coil through the route: primary coil $L_1$→damper diode $D_1$→MOSFET $T_1$→primary coil $L_1$, the CPU provides a trigger signal st (see FIG. 9D) to the thyristor $S_1$ and places the thyristor in the ON state, which places the transistor $T_2$ (charging switch) in the OFF state and prevents current flow to the exciter coil Lex through the route: exciter coil Lex→diode $D_2$→transistor $T_2$→MOSFET $T_1$→diode $D_4$→exciter coil Lex and through the route: exciter coil Lex→diode $D_2$→transistor $T_2$→capacitor $C_1$→primary coil $L_1$→diode $D_4$→exciter coil Lex. Thereby, in a state in which the occurrence of armature reaction in the magneto generator caused by current flow through the primary coil and current flow through the exciter coil is prevented, a voltage induced in the secondary coil $L_2$ due to a change in magnetic flux that is inputted to the armature core from the magneto rotor is applied to the ignition plug P in a state in which the insulation thereacross has been broken down due to a first spark discharge, whereby a second spark discharge is produced in the ignition plug P.

FIGS. 9(G), (H), and (I) schematically illustrate respective waveforms of a primary current $ig_1$, a secondary voltage $Vg_2$, and a secondary current $ig_2$ in the ignition coil. Of the parts of the waveform of the secondary voltage $Vg_2$ in the ignition coil illustrated in FIG. 9(H), the portion indicated by symbol $V_{2a}$ is a waveform of high voltage used for ignition in an oscillating waveform produced by discharging the ignition capacitor, and the portion indicated by symbol $V_{2b}$ is a waveform of a secondary voltage when an output voltage of the magneto generator is being induced in the secondary coil of the ignition coil. Of the parts of the waveform of the secondary current illustrated in FIG. 9(I), the portion indicated by symbol $i_{2a}$ is a waveform of a discharge current that flows while a first spark discharge is being produced, and the portion indicated by symbol $i_{2b}$ is a waveform of a discharge current that flows when an output voltage of the magneto generator is being applied to the ignition plug from the secondary coil of the ignition coil.

In conventional capacitor discharge ignition devices, because ignition of the engine is due only to a spark discharge produced when a voltage $V_{2a}$, which is produced when the ignition capacitor has been discharged, is applied to the ignition plug, the duration of spark discharges are extremely short and ignition energy may be insufficient.

However, with the present invention, because a voltage $V_{2b}$ is generated following a voltage $V_{2a}$ and a second spark discharge is produced, the duration of ignition sparks can be made longer and ignition energy can be increased.

The stroke discrimination means 43 makes use of the fact that the breakdown voltage across the discharge gap of the ignition plug detected through the breakdown voltage detection circuit 4F from partway along the secondary coil $L_2$ of the ignition coil when a first spark discharge is produced differs between an exhaust stroke and a compression stroke, and thereby performs a process that discriminates whether a stroke of the engine is a compression stroke or an exhaust stroke. Because it takes a certain amount of time for this process to finish after the engine is started, in the present embodiment, when the engine is started, ignition is performed not only at a regular ignition position set in the vicinity of a top dead center position of a compression stroke, but also at an ignition position set in the vicinity of a top dead center position of an exhaust stroke. After a certain amount of time has elapsed after the engine is started and the process that discriminates whether the stroke of the engine is a compression stroke or an exhaust stroke has finished, an ignition operation is only performed at the regular ignition position set in the vicinity of a top dead center position of a compression stroke.

In the embodiment illustrated in FIG. 4, the damper diode $D_1$ is provided so that after the ignition capacitor $C_1$ has been discharged, a series resonance circuit that discharges the capacitor $C_1$ is not formed on a primary side of the ignition coil after the ignition capacitor $C_1$ is charged in an opposite direction. The damper diode D1 is also provided in order to lengthen an interval of an initial half-wave of high voltage induced in the secondary coil $L_2$ of the ignition coil after the ignition capacitor is discharged, and to lengthen the duration of the first spark discharge. This is done by releasing, over time, energy accumulated by the primary coil $L_1$ of the ignition coil through the diode $D_1$ and the MOSFET $T_1$.

Figure 5:
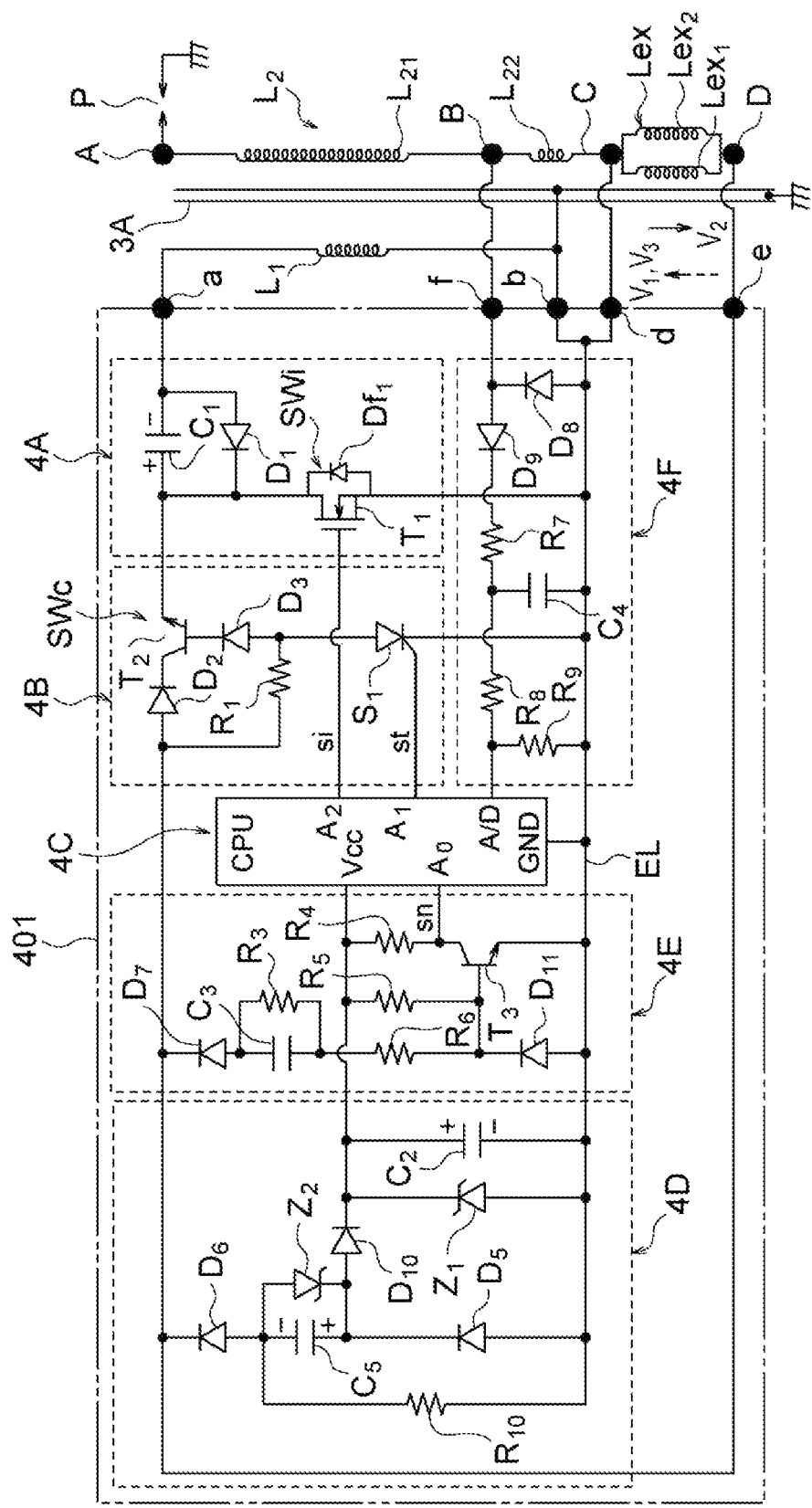
FIG. 5 is a circuit diagram illustrating another example configuration of the circuit of the ignition device of the embodiment illustrated in FIG. 1.

The configuration of the electrical circuit of the ignition device according to the present invention is not limited to the example illustrated in FIG. 4. FIG. 5 illustrates another example circuit configuration of the ignition device according to the present invention. In this example, the power supply circuit 4D and the rotation detection circuit 4E have configurations that differ from the example illustrated in FIG. 4. Further, the exciter coil Lex is made up of a pair of coils $Lex_1$ and $Lex_2$ that are wound in the same direction and connected to one another in parallel, and the secondary coil $L_2$ and the exciter coil Lex are connected in series.

The power supply circuit 4D illustrated in FIG. 5 is configured by a diode $D_5$, a capacitor $C_5$, a diode $D_6$, a Zener diode $Z_2$, a diode $D_{10}$, a power supply capacitor $C_2$, and a Zener diode $Z_1$. An anode of the diode $D_5$ is connected to the earth line EL. One end of the capacitor $C_5$ is connected to a cathode of the diode $D_5$. The diode $D_6$ is connected between the other end of the capacitor $C_5$ and the anode of the diode $D_2$, with an anode of the diode $D_6$ being pointed toward the capacitor $C_5$. The Zener diode $Z_2$ is connected, in parallel, across both ends of the capacitor $C_5$, with a cathode of the Zener diode $Z_2$ being pointed toward the diode $D_5$. An anode of the diode $D_{10}$ is connected to a point where the capacitor $C_5$ and the cathode of the diode $D_5$ is connected. The power supply capacitor $C_2$ is connected between the cathode of the diode $D_{10}$ and the earth line EL. The Zener diode $Z_1$ is connected, in parallel, across both ends of the power supply capacitor $C_2$, with an anode of the Zener diode $Z_2$ pointed toward the earth line.

In the power supply circuit 4D illustrated in FIG. 5, the capacitor $C_5$ is charged to the illustrated polarity when the exciter coil Lex generates a first half-wave voltage $V_1$ and when the exciter coil Lex generates a third half-wave voltage $V_3$, and the power supply capacitor $C_2$ is charged to the illustrated polarity by the voltage across both ends of the capacitor $C_5$.

In the rotation detection circuit 4E illustrated in FIG. 5, a diode $D_{11}$ is connected between the base and the emitter of the transistor $T_3$ with an anode of the diode $D_{11}$ being connected to the earth line EL. An integrating circuit is also connected between the base of the transistor $T_3$ and a line tied to a terminal of the exciter coil Lex on the opposite side of the exciter coil Lex to the secondary coil $L_2$. This integrating circuit is configured by the series connection of a resistor $R_6$, a parallel circuit having a capacitor $C_3$ and a resistor $R_3$, and a diode $D_7$ configured having an anode thereof pointed toward the parallel circuit.

In the example illustrated in FIG. 5, one end of the circuit board 401 is formed with a terminal electrode a, terminal electrodes b and d, a terminal electrode f, and a terminal electrode e. The terminal electrode a is tied to the one end of the ignition capacitor $C_1$. The terminal electrodes b and d are connected to the earth line EL. The terminal electrode f is connected to the anode of the diode $D_9$. The terminal electrode e is connected to a line tied to the anode of the diode $D_2$ of the charging circuit. The primary coil $L_1$ of the ignition coil is connected between the terminal electrodes a and b. The terminal electrode b is connected to the armature core 3A, which is a part at the ground potential, and the exciter coil Lex is connected between the terminal electrodes d and e. The terminal electrode f is connected to the tap B of the secondary coil of the ignition coil. Through the tap B, a voltage from partway along the secondary coil $L_2$ is inputted to the dielectric breakdown voltage detection circuit 4F. Other configuration of the embodiment illustrated in FIG. 5 is the same as in the embodiment illustrated in FIG. 4.

In the rotation detection circuit 4E illustrated in FIG. 5, when the exciter coil Lex is not generating a first half-wave voltage $V_1$ and a third half-wave voltage $V_3$, the transistor $T_3$ assumes the ON state due to a base current that is provided from the power supply circuit 4D to the transistor $T_3$ through the resistor $R_5$, and the electric potential at the collector of the transistor $T_3$ is at roughly the ground potential. While a first half-wave voltage $V_1$ and a third half-wave voltage $V_3$ generated by the exciter coil Lex exceed the voltage across both ends of the capacitor $C_3$, current flows through the diode $D_{11}$, and due to the voltage across both ends of the diode $D_{11}$ dropping, the transistor $T_3$ assumes the OFF state and the voltage between the collector and the emitter of the transistor $T_3$ is increased. Consequently, between the collector and the emitter of the transistor $T_3$, there is obtained a signal that rises to about the power supply voltage in a stepwise manner when a first half-wave voltage $V_1$ and a third half-wave voltage $V_3$ have risen and that falls in a stepwise manner when the first half-wave voltage $V_1$ and the third half-wave voltage $V_3$ have fallen. The CPU recognizes rising edges in this signal as rotation detection signals sn, and recognizes rotation detection signals occurring at a rising edge of a first half-wave voltage $V_1$ as reference signals. Other features are the same as in the embodiment illustrated in FIG. 4.

When the exciter coil Lex is configured by a pair of coils $Lex_1$ and $Lex_2$ that are wound in the same direction and connected to one another in parallel as described above, loss in the circuit that charges the ignition capacitor $C_1$ is reduced, enabling the ignition capacitor to be charged to a higher voltage.

Figure 6:
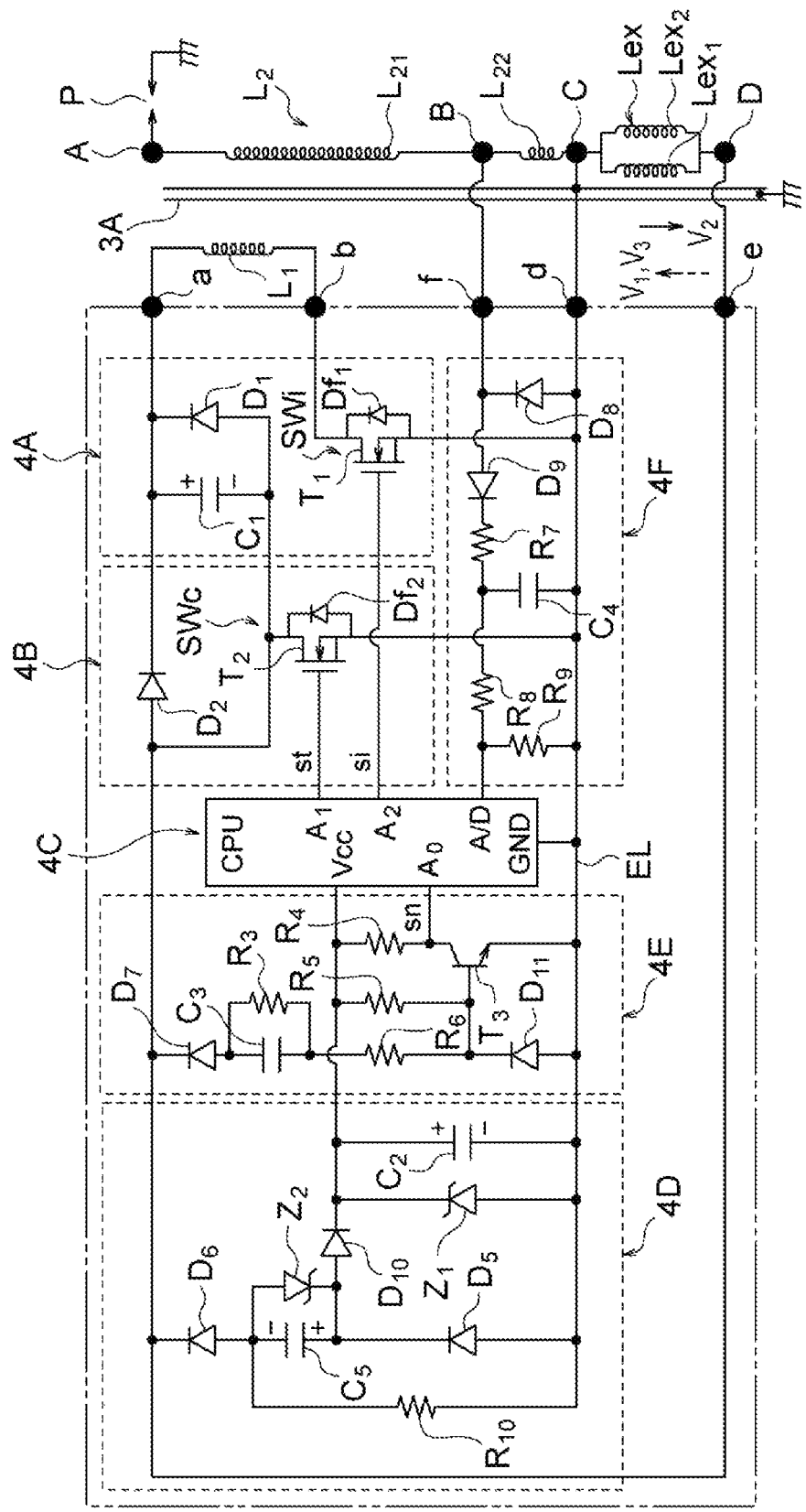
FIG. 6 is a circuit diagram illustrating yet another example configuration of the circuit of the ignition device of the embodiment illustrated in FIG. 1.

FIG. 6 illustrates another example configuration of the ignition device according to the present invention. In this example, the ignition circuit 4A and the charging circuit 4B have configurations that differ from the example illustrated in FIG. 4 and the example illustrated in FIG. 5. The ignition circuit 4A illustrated in FIG. 6 includes an ignition capacitor $C_1$, a MOSFET $T_1$ and a damper diode $D_1$. One end of the ignition capacitor $C_1$ is connected to the one end of the primary coil $L_1$. A drain of the MOSFET $T_1$ is connected to another end of the ignition capacitor $C_1$, and a source of the diode $D_1$ is connected to the earth line EL. The damper diode $D_1$ is connected across both ends of the ignition capacitor $C_1$. The charging circuit 4B includes a diode $D_2$ and a MOSFET $T_2$. An anode of the diode $D_2$ is connected to one end of the exciter coil Lex, and a cathode of the diode $D_2$ is connected to the one end of the ignition capacitor $C_1$. A drain of the MOSFET $T_2$ is connected to the other end of the ignition capacitor C1, and a source of the MOSFET $T_2$ is connected to the earth line EL. A parasitic diode $Df_2$ is formed between the drain and the source of the MOSFET $T_2$. Other features are configured the same as in the example illustrated in FIG. 5.

In the example illustrated in FIG. 6, one end of the circuit board 401 is formed with a terminal electrode a, a terminal electrode b, a terminal electrode d, a terminal electrode f, and a terminal electrode e. The terminal electrode a is tied to the one end of the ignition capacitor $C_1$. The terminal electrode b is connected to the drain of the MOSFET $T_1$. The terminal electrode d is connected to the earth line EL. The terminal electrode f is connected to the anode of the diode $D_9$. The terminal electrode e is connected to a line tied to the anode of the diode $D_2$ of the charging circuit. The primary coil $L_1$ of the ignition coil is connected between the terminal electrodes a and b. The terminal electrode d is connected to the armature core 3A, which is a part at the ground potential, and is connected to a point C where the exciter coil Lex and the secondary coil $L_2$ connect. The terminal electrode e is connected to a terminal D of the exciter coil Lex on the opposite side of the exciter coil Lex to the secondary coil $L_2$.

In the embodiment illustrated in FIG. 6, the CPU provides a drive signal st to the MOSFET $T_2$ when a reference signal is generated at moments $t_1$, $t_4$, . . . depicted in FIG. 9. The MOSFET $T_2$ assumes the ON state when a second half-wave voltage $V_2$ is generated by the exciter coil Lex at moments $t_2$ and $t_5$, and a charging current flows to the ignition capacitor $C_1$ through the route: exciter coil Lex→diode $D_2$→ignition capacitor $C_1$→MOSFET $T_2$→exciter coil Lex.

A drive signal is provided to the MOSFET $T_1$ when the CPU generates an ignition signal si at an ignition timing. This MOSFET therefore assumes the ON state, and electric charge accumulated by the ignition capacitor $C_1$ is discharged through the route: ignition capacitor $C_1$→primary coil $L_1$→MOSFET $T_1$→MOSFET $T_2$→parasitic diode $Df_2$→ignition capacitor $C_1$. Thereby, a high voltage is induced in the secondary coil of the ignition coil and a first spark discharge is generated in the ignition plug. When a time Ty has elapsed from the ignition timing, the CPU removes the ignition signal and places the MOSFET $T_1$ in the OFF state while at the same time removing the drive signal that had been provided to the MOSFET $T_2$ and placing the MOSFET T2 in the OFF state, giving rise to a state in which current does not flow through the primary coil $L_1$ of the ignition coil and the exciter coil Lex, and a voltage induced in the secondary coil $L_2$ due to a change in magnetic flux that is inputted to the armature core from the magneto rotor is applied to the ignition plug, the insulation across the discharge gap thereof having been broken down by the first spark discharge, producing a second spark discharge.

<Program Executed by the CPU>

The reference signal identification means 41, the ignition timing calculation means 42, the stroke discrimination means 43, the timer 1 setting means 44, the ignition signal generation means 45, the switch turn-ON means 46, the timer 0 setting means 48, and the switch turn-OFF means 49 illustrated in FIG. 8 are configured by executing a program stored in the ROM of the microcomputer using the CPU.

Figure 10:
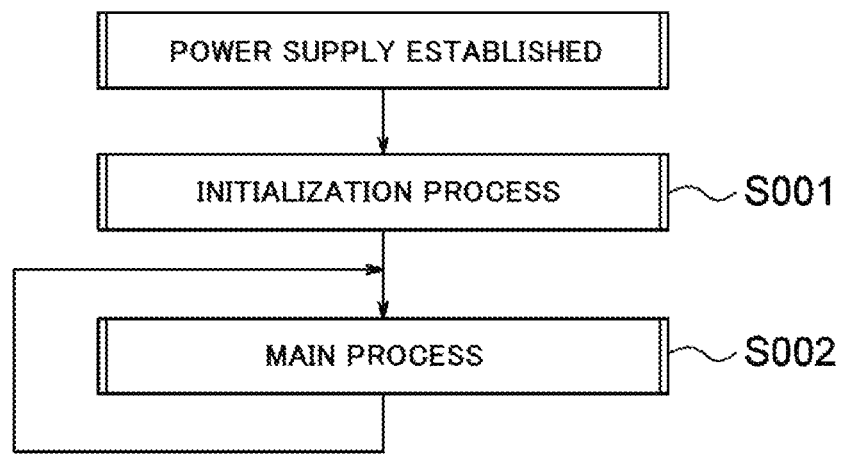
FIG. 10 is a flowchart illustrating an overall flow of a program executed by the microcomputer used in the embodiment illustrated in FIG. 1.
Figure 11:
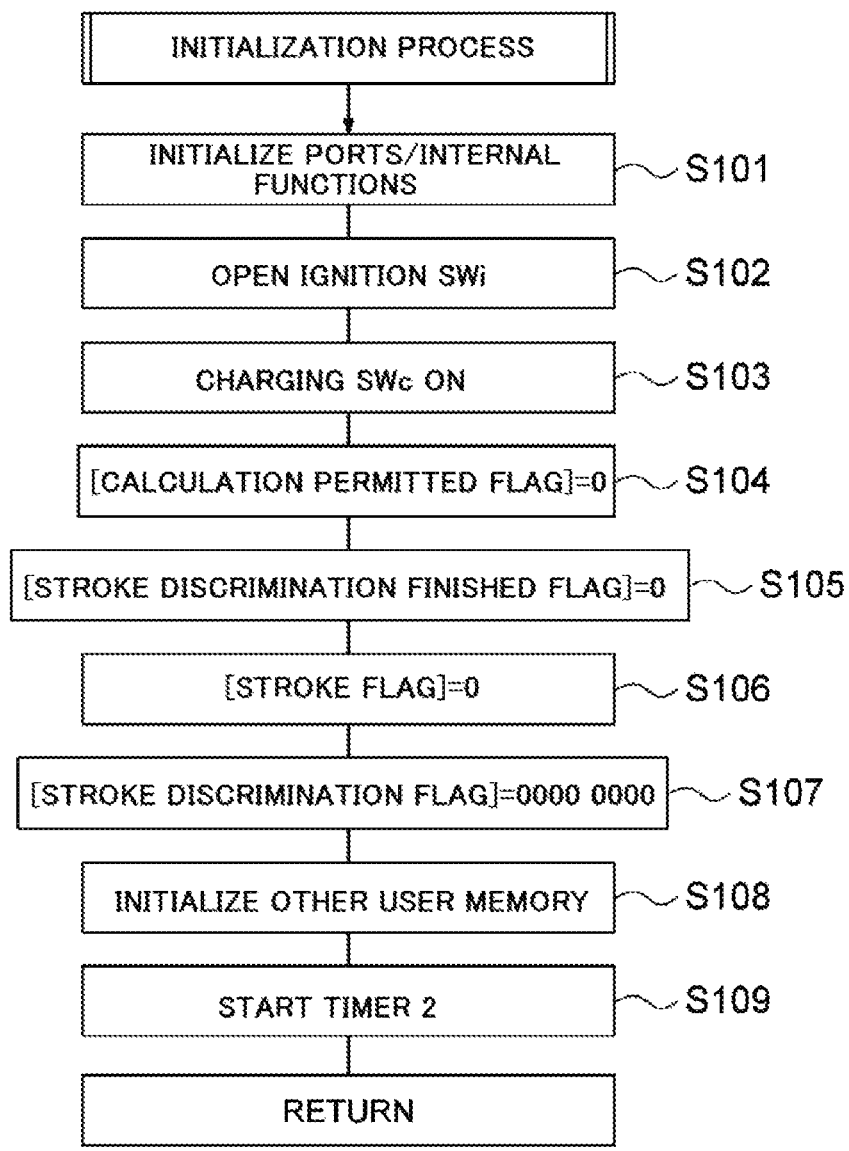
FIG. 11 is a flowchart illustrating an algorithm for an initialization process executed by the microcomputer used in the embodiment illustrated in FIG. 1.
Figure 12:
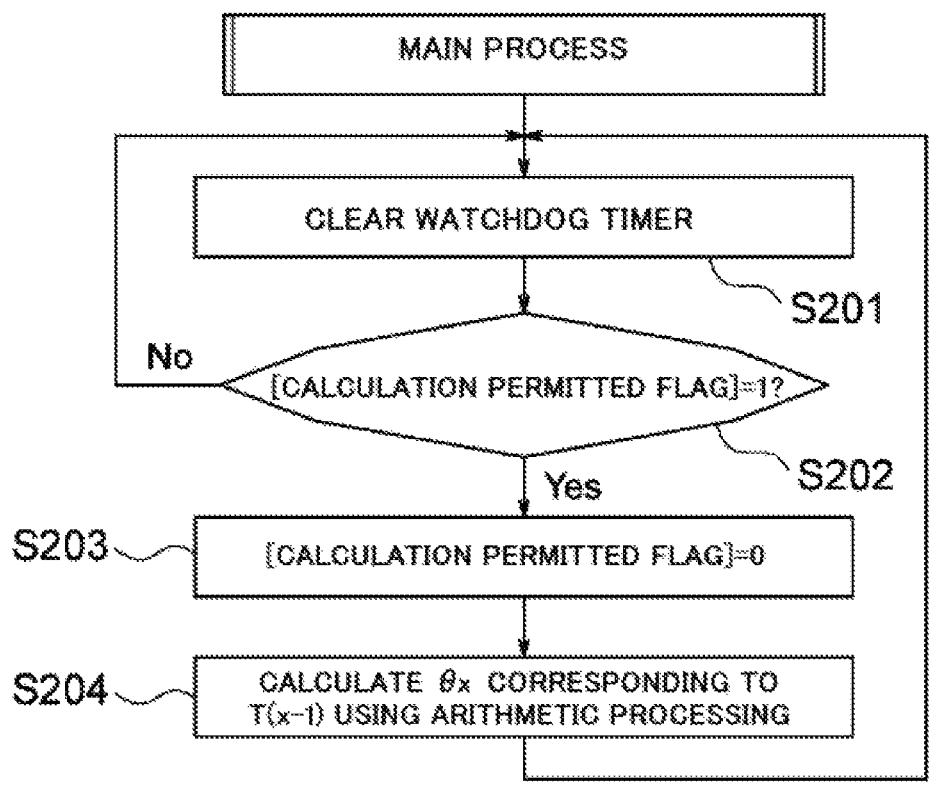
FIG. 12 is a flowchart illustrating an algorithm for a main process executed by the microcomputer used in the embodiment illustrated in FIG. 1.
Figure 13:
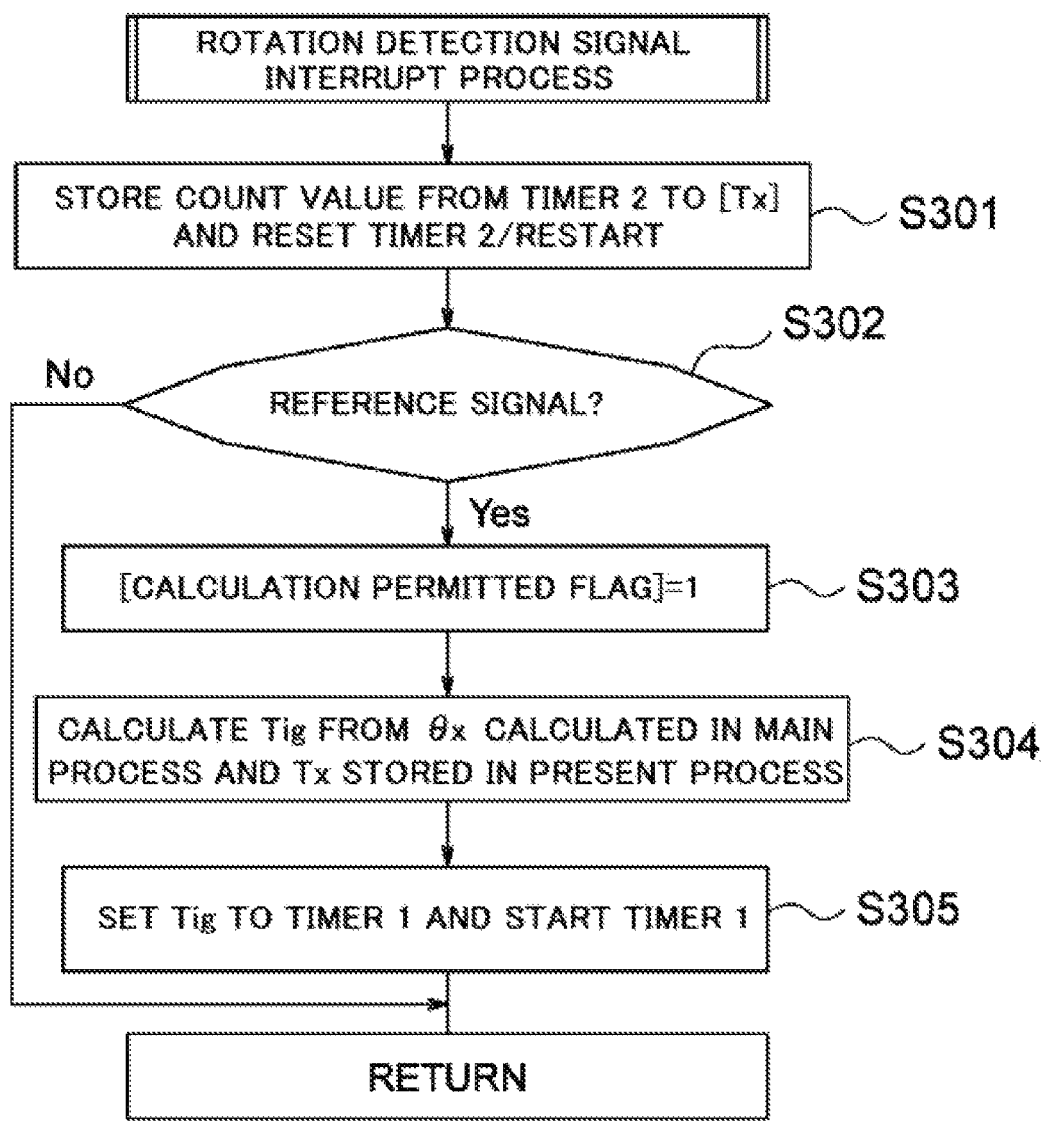
FIG. 13 is a flowchart illustrating an algorithm for a rotation detection signal interrupt process executed by the microcomputer used in the embodiment illustrated in FIG. 1.
Figure 14:
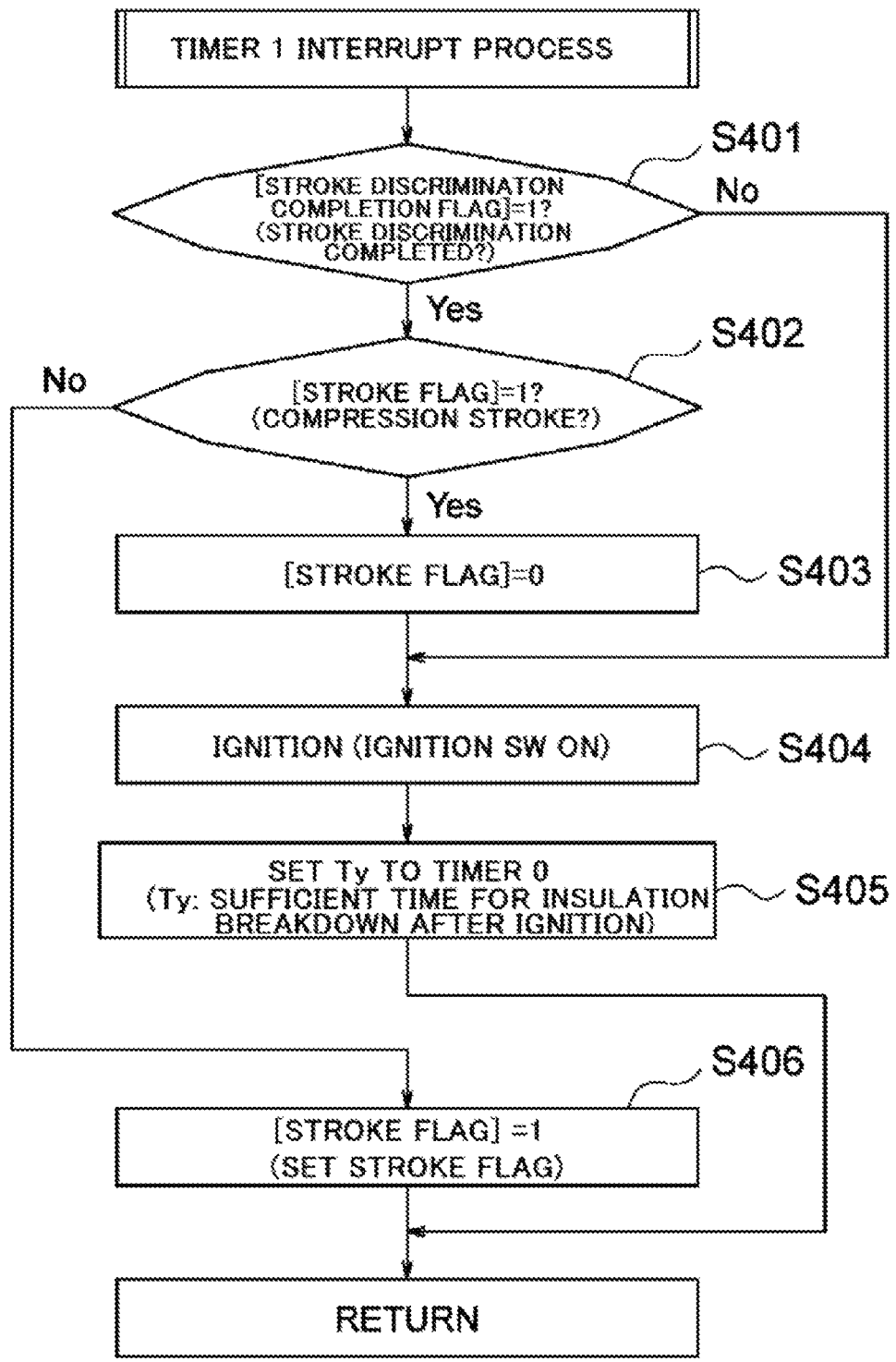
FIG. 14 is a flowchart illustrating an algorithm for a timer 1 interrupt process executed by the microcomputer used in the embodiment illustrated in FIG. 1.
Figure 15:
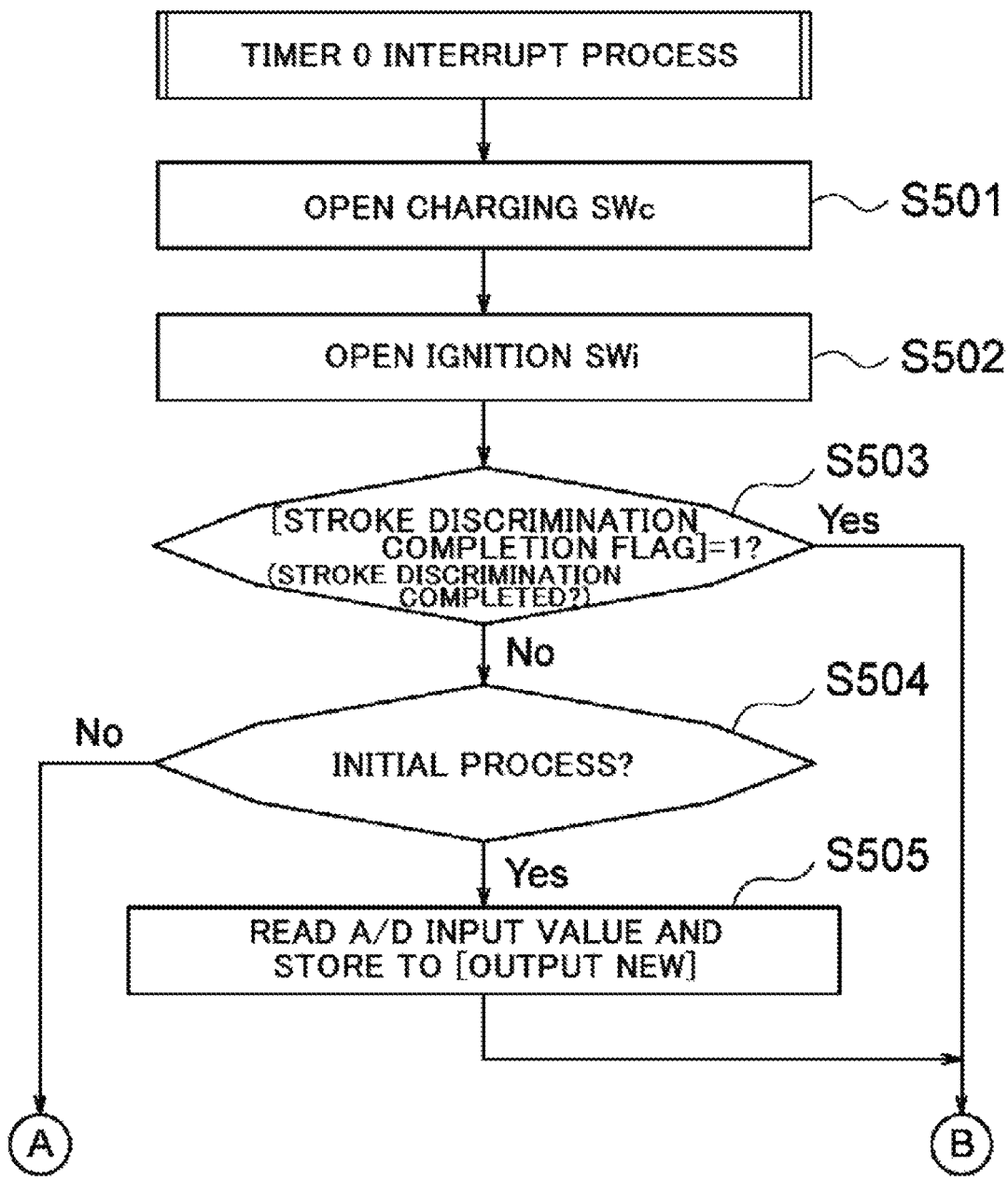
FIG. 15 is a flowchart illustrating part of an algorithm for a timer 0 interrupt process executed by the microcomputer used in the embodiment illustrated in FIG. 1.
Figure 16:
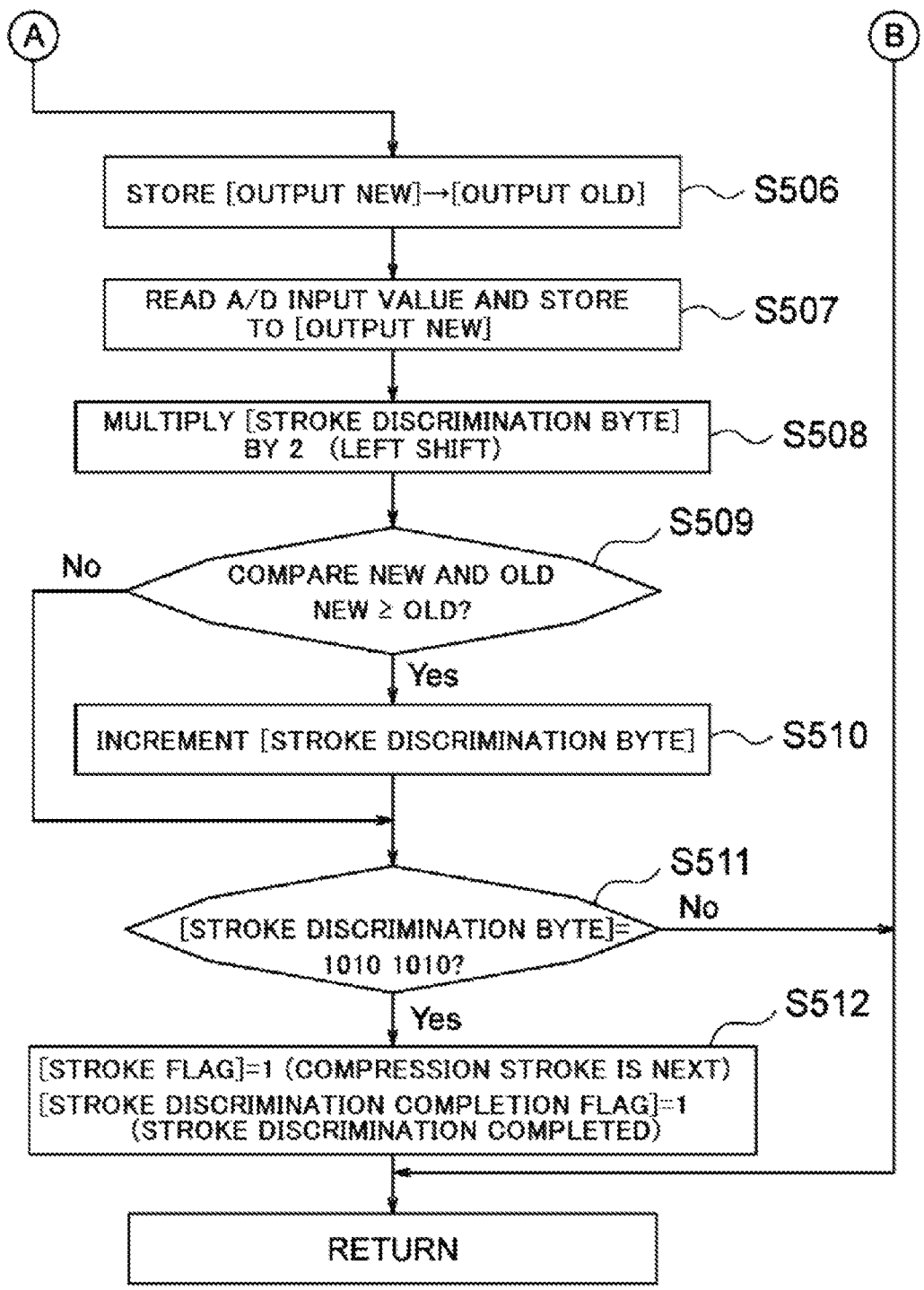
FIG. 16 is a flowchart illustrating the rest of the algorithm for a timer 0 interrupt process executed by the microcomputer used in the embodiment illustrated in FIG. 1.

FIGS. 10 to 16 depict flowcharts illustrating algorithms of the program executed by the CPU in order to configure the functional means illustrated in FIG. 8. FIG. 10 is a flowchart that broadly illustrates a flow of processes executed after the microcomputer has been powered on. FIG. 11 is a flowchart that illustrates a flow of an initialization process executed first after the microcomputer has been powered on. FIG. 12 is a flowchart illustrating an algorithm for a main process executed after the initialization process has finished. FIG. 13 is a flowchart illustrating an algorithm for a rotation detection signal interrupt process executed each time the rotation detection circuit 4E generates a rotation detection signal. FIG. 14 is a flowchart illustrating a flow of a timer 1 interrupt process executed when timer 1 has finished counting down a time Tig set thereto. FIG. 15 is a flowchart illustrating part of a flow of a timer 0 interrupt process executed when timer 0 has finished counting down a time Ty set thereto. FIG. 16 is a flowchart illustrating the rest of the flow of the timer 0 interrupt process.

In cases in which the algorithms illustrated in FIGS. 10 to 16 are followed, an engine start operation is performed, and when the microcomputer has been powered on, first, at step S001 in FIG. 10, an initialization process (FIG. 11) is performed for each part of the microcomputer, and when the initialization process has finished the main process (FIG. 12) illustrated in step S002 of FIG. 10 is performed.

In the initialization process illustrated in FIG. 11, first, at step S101, the ports and various internal functions of the CPU are initialized, and then, at step S102, the ignition switch SWi is placed into an open state (OFF state). The initialization process then proceeds to step S103, where the charging switch SWc is placed into a state able to be turned ON. This is a state provided with a drive signal so that the charging switch SWc will immediately turn ON if a voltage is applied across both ends thereof. At step S103, a drive signal is provided to a switch element (transistor $T_2$ in the examples illustrated in FIGS. 4 and 5, MOSFET $T_2$ in the example illustrated in FIG. 6) configuring the charging switch SWc, and the charging switch SWc is placed into a state able to be immediately turned ON if a voltage is applied to the charging switch SWc. Then, at step S104, a [calculation permitted flag] is cleared to 0, and at step S105, a [stroke discrimination finished flag] is cleared to 0. At step S106, a [stroke flag] is cleared to 0, and at step S107, a [stroke discrimination byte] is set to [0000 0000]. Then, at step S108, other user memory is initialized, and at step S109, timer 2 is started, after which the initialization process ends.

After the initialization process of FIG. 11 has ended, the main process of FIG. 12 is performed. In the main process, first, at step S201, a watchdog timer is cleared, and at step S202, a determination is made as to whether or not the [calculation permitted flag] is set to 1. As a result thereof, the main process returns to step S201 when it has been determined that the [calculation permitted flag] is not set to 1, and when it has been determined that the [calculation permitted flag] is set to 1, the [calculation permitted flag] is cleared to 0 at step S203. Afterwards, at step S204, information relating to the speed of the engine included in the previous count value Tx−1 from timer 2 read each time a rotation detection signal sn is generated is used to perform a calculation that determines an angle θx from a crank angle position (reference position) to where a reference signal was generated to an ignition position, which is a crank angle position where engine ignition is performed. The angle θx is, for example, determined by referring to a map that correlates Tx−1 and θx and performing a complementary calculation.

The rotation detection signal interrupt process illustrated in FIG. 13 is performed each time a rotation detection signal sn is generated. In this interrupt process, first, at step S301, a count value (Txa or Txb illustrated in FIG. 9C) from timer 2 is read and stored in memory as [Tx], and after being reset, timer 2 is restarted. Then, at step S302, it is identified whether or not the most recent rotation detection signal sn is a reference signal. This identification is performed by making a determination as to whether or not the count value from the timer that was just read is greater than the count value from timer 2 that was read when a rotation detection signal was last generated before that. In other words, when the count value from the timer 2 that was just read is greater than the count value from timer 2 that was last read before that (when the count value that was just read is Txb), the rotation detection signal that was just generated is identified as a reference signal generated at a rising edge of a first halfwave voltage.

At step S302, when, as a result of performing the identification as to whether or not the most recent rotation detection signal sn is a reference signal, it has been determined that the rotation detection signal sn is not a reference signal, nothing more is done and the program exits this process. When at step S302 the most recent rotation detection signal sn has been identified as a reference signal, the interrupt process proceeds to step S303 and the [calculation permitted flag] is set to 1. Then, at step S304, the θx calculated in the main process and the Tx that stored in memory at step S301 are used to calculate, as a count time used for ignition timing detection Tig, the amount of time needed to rotate the angle θx (to the ignition position) from the crank angle position (the current crank angle position) where the reference signal was generated. Then, at step S305, the count time used for ignition timing detection Tig is set to timer 1 and timer 1 is immediately made to begin counting down, after which the program returns to the main process.

The timer 1 interrupt process illustrated in FIG. 14 is performed when timer 1 has finished counting down the count value Tig set thereto. In this interrupt process, at step S401, a determination is made as to whether or not a [stroke discrimination completion flag] is set to 1 (a determination is made as to whether or not a stroke discrimination process has finished). In cases in which, as a result thereof, it has been determined that the [stroke discrimination completion flag] is set to 1 (that the stroke determination process has finished), the interrupt process proceeds to step S402 and a determination is made as to whether or not the [stroke flag] is set to 1 (a determination is made as to whether or not the current stroke is a compression stroke). In cases in which, as a result thereof, it has been determined that the [stroke flag] is set to 1 (that the current stroke is a compression stroke), the interrupt process proceeds to step S403 and the [stroke flag] is cleared to 0. Then, at step S404, an ignition signal is generated and the ignition switch is placed into the ON state, which discharges the ignition capacitor $C_1$ and produces a first spark discharge in the ignition plug. Then, at step S405, timer 0 is set to the time Ty, after which the program exits this process. The time Ty is the amount of time needed for the insulation across the discharge gap of the ignition plug to reach a broken down state after an ignition signal is generated and the ignition capacitor $C_1$ begins to discharge. In cases in which, at step S402, it has been determined that the [stroke flag] is not set to 1 (that the stroke determination process is not yet finished), the interrupt process proceeds to step S406 and the [stroke flag] is set to 1, after which the program returns to the main process.

The timer 0 interrupt process illustrated in FIGS. 15 and 16 is performed when, after the ignition capacitor $C_1$ has been discharged, timer 0 has finished counting down the count value Ty set thereto. In this interrupt process, first, at step S501 in FIG. 15, the charging switch SWc is placed into the OFF state (open state), and then, at step S502, the ignition switch SWi is placed into the OFF state. Then, at step S503, a determination is made as to whether or not the [stroke discrimination completion flag] is set to 1 (a determination is made as to whether or not stroke discrimination has finished). When, as a result thereof, it has been determined that the [stroke discrimination completion flag] is not set to 1 (that stroke discrimination is not finished), the interrupt process proceeds to step S504 and a determination is made as to whether or not the current process is an initial process. When in this determination it has been determined that the current process is an initial process, the interrupt process proceeds to step S505, a signal outputted by the breakdown voltage detection circuit 4F is read from an A/D input terminal of the CPU, and after storing a value that has been read as [Output NEW], the program exits this process.

When at step S504 it has been determined that the current process is not an initial process, the interrupt process proceeds to step S506 in FIG. 16 and the content of [Output NEW] is stored as [Output OLD]. Then, at step S507, data that has been inputted to the A/D input terminal of the CPU is stored as [Output NEW]. Then, the interrupt process proceeds to step S508, and after multiplying the [stroke discrimination byte] by 2 (after shifting the [stroke discrimination byte] to the left), the interrupt process proceeds to step S509 and [Output NEW] and [Output OLD] are compared. When, as a result thereof, it has been determined that [Output NEW]≥[Output OLD], the interrupt process proceeds to step S510 and the [stroke discrimination byte] is incremented, and at step S511 a determination is made as to whether or not the [stroke discrimination byte] matches [1010 1010]. When, as a result of this determination, it has been determined that the [stroke discrimination byte] does not match [1010 1010], nothing more is done and the program exits this process. When at step S511 it has been determined that the [stroke discrimination byte] matches [1010 1010], the interrupt process proceeds to step S512 and the [stroke flag] is set to 1 so that the stroke of the engine is determined to be a compression stroke the next time the timer 0 interrupt process is performed. Then the [stroke discrimination completion flag] is set to 1 in order to indicate that the stroke discrimination process has finished and the program exits this process.

With the algorithms illustrated in FIGS. 10 to 16, the reference signal identification means 41 is configured by a procedure that performs step S302 of the process of FIG. 13, and the ignition timing calculation means 42 is configured by a procedure that performs step S204 of the process of FIG. 12 and a procedure that performs the process of step S304 of FIG. 13. The stroke discrimination means 43 is configured by a procedure that executes steps S401 to S403 and S406 of the timer 1 interrupt process of FIG. 14 and a procedure that executes steps S503 to S512 of the timer 0 interrupt process of FIGS. 15 and 16, and the timer 1 setting means 44 is configured by a procedure that executes step S305 of the rotation detection signal interrupt process of FIG. 13. The ignition signal generation means 45 and the switch turn-ON means 46 are configured by step S404 of the timer 1 interrupt process of FIG. 14, and the timer 0 setting means 48 is configured by step S405 of the process of FIG. 14. Further, the switch turn-OFF means 49 is configured by steps S501 and S502 of the timer 0 interrupt process illustrated in FIGS. 15 and 16.

Although several embodiments of the present invention have been described, the present invention is not limited to the above embodiments, and it goes without saying that various modifications are possible within the technical scope and spirit of the invention set forth in the patent claims.

For example, although in each of the above embodiments an outer-magnet type magneto generator provided with a magneto rotor that is provided with a three-pole magnetic field at the outer circumference of the flywheel attached to the crank shaft of the engine is used, any magneto generator provided with a magneto rotor that is rotationally driven by the engine and with a stator having an armature core that is inputted with magnetic flux from the magneto rotor and around which an ignition coil and an exciter coil are wound would suffice for the magneto generator used in order to carry out the ignition method according to the present invention, and the magneto generator is not limited to being an outer-magnet type magneto generator.

Further, any switch element capable of ON/OFF control would suffice for the switch elements configuring the ignition switch and the charging switch used in the ignition device according to the present invention, and such switch elements are not limited to being MOSFETs and bipolar transistors.

INDUSTRIAL APPLICABILITY

The ignition device according to the present invention is able to be utilized as an ignition device for performing the ignition of a variety of internal combustion engines. With the present invention, spark discharges that rise quickly and moreover have long durations can be produced in the ignition plug, enabling ignition timings to be stabilized and ignition energy to be increased, and enabling engine performance to be improved.

Explanation of Numerals and Characters
1 Magneto generator
2 Magneto rotor
201 Flywheel
202 Permanent magnet
2a, 2b Magnetic pole of magneto rotor
3 Stator
3A Armature core
3a, 3b Magnetic pole part of armature core
3B Coil unit
303 Primary bobbin
304 Secondary bobbin
$L_1$ Primary coil
$L_2$ Secondary coil
A Ungrounded output terminal of secondary coil
B Tap led out from secondary coil
C Grounded output terminal of secondary coil
Lex Exciter coil
4 Electronics unit
401 Circuit board
4A Ignition circuit
4B Charging circuit
4C Microcomputer
4D Power supply circuit
4E Rotation detection circuit
4F Breakdown voltage detection circuit
$C_1$ Ignition capacitor
SWi Ignition switch
SWc Charging switch
$T_1$ Field-effect transistor
$T_2$ Transistor
$S_1$ Thyristor
$D_1$ Damper diode
P Ignition plug

The invention claimed is:

1. An engine ignition device that applies a high voltage to an ignition plug attached to a cylinder of an engine to produce spark discharges in the ignition plug, the engine ignition device comprising:
a magneto generator that is provided with a magneto rotor having a three-pole magnetic field formed at an outer circumference of a flywheel attached to a crank shaft of the engine and a stator having an armature core with a magnetic pole part opposed to the poles of the magnetic field of the magneto rotor and having a plurality of coils served as magneto coils which are wound around the armature core, the plurality of coils including an exciter coil and a primary coil of an ignition coil and a secondary coil of the ignition coil, the magneto generator sequentially outputting, from the magneto coils, a first half-wave voltage, a second half-wave voltage of a different polarity from the first half-wave voltage, and a third half-wave voltage of the same polarity as the first half-wave voltage during one rotation of the crank shaft;
an ignition capacitor that is provided on a primary side of the ignition coil;
a charging switch that is provided so as to be turned on when the second half-wave voltage is induced in the exciter coil and to form a circuit that charges the ignition capacitor with the second half-wave voltage;
an ignition switch that is provided so as to form a discharging circuit that discharges, through the primary coil, electric charge accumulated in the ignition capacitor when the ignition switch is turned on;
an ignition timing detector configured to generate an ignition signal when an ignition timing of the engine is detected; and
a switch control processor configured to:
place the ignition switch to be turned on in order to produce a first spark discharge in the ignition plug when the ignition timing is detected; and
control the ignition switch and the charging switch so as to give rise to a state in which both the ignition switch and the charging switch are in an open state thereby preventing current from flowing to the primary coil while insulation across a discharge gap of the ignition plug is in broken down state due to the first spark discharge, wherein
the engine ignition device being configured so that a second spark discharge is produced in the ignition plug due to a voltage induced in the secondary coil of the ignition coil accompanied with a change in magnetic flux that is inputted to the armature core from the magneto rotor while the insulation across the discharge gap of the ignition plug is in the broken down state due to the first spark discharge.

2. The engine ignition device of claim 1, wherein
the engine ignition device is provided with a rotation detection circuit that detects a specific feature in a waveform of voltage induced in the exciter coil and outputs a plurality of rotation detection signals which include a rotation detection signal generated at a reference position set at a position coming before a crank angle position coming when a piston of the engine reaches top dead center, and a reference signal identification means for identifying, from among the plurality of rotation detection signals outputted by the rotation detection circuit, a rotation detection signal generated at the reference position as a reference signal; and the ignition timing detector is configured so as to detect the ignition timing based on a timing at which the reference signal was generated and generate an ignition signal.

3. The engine ignition device of claim 2, wherein
the engine ignition device is provided with a stroke discrimination means for discriminating whether a stroke of the engine performed when the reference signal was generated is a compression stroke or an exhaust stroke; and
the switch control processor is configured so as to perform control that places the ignition switch in the ON state at the ignition timing detected by the ignition timing detector only when the stroke of the engine performed when the reference signal was generated is discriminated to be a compression stroke by the stroke discrimination means.

4. The engine ignition device of claim 3, wherein
the stroke discrimination means is provided with a breakdown voltage detection circuit that obtains a voltage signal including information relating to a voltage across the discharge gap of the ignition plug from partway along the secondary coil, and is configured so as to perform stroke discrimination on the basis of the fact that a magnitude of the voltage signal obtained from the breakdown voltage detection circuit when the insulation across the discharge gap of the ignition plug is broken down differs between when a stroke of the engine is an exhaust stroke and when a stroke of the engine is a compression stroke.

5. The engine ignition device of claim 4, wherein
a tap is led out from a middle of the secondary coil, and the breakdown voltage detection circuit is configured so as to detect a voltage induced partway along the secondary coil through the tap.

6. The engine ignition device of claim 3, wherein
the engine ignition device is provided with a power supply circuit that generates a control DC voltage using the first half-wave voltage and the third half-wave voltage induced in the exciter coil, and
the engine ignition device is provided with a CPU that operates using the control DC voltage generated by the power supply circuit as a power supply voltage, and the switch control processor and the stroke discrimination means are configured by the CPU executing a program that has been prepared in advance.

7. The engine ignition device of claim 1, wherein
the ignition timing of the engine is set in a period of time during which the second half-wave voltage induced in the exciter coil moves toward a peak.

8. The engine ignition device of claim 1, wherein
a damper diode is connected, in parallel, across both ends of the ignition capacitor, the damper diode being pointed in an orientation so that when the ignition capacitor is in a state charged to one polarity, a voltage across both ends of the ignition capacitor is applied in an opposite direction across an anode and a cathode of the damper diode.

9. The engine ignition device of claim 1, wherein
the primary coil of the ignition coil is wound around a primary bobbin attached to the armature core, a secondary bobbin is disposed so as to encompass the primary bobbin, the secondary coil of the ignition coil and the exciter coil are wound around the secondary bobbin, and the secondary coil and the exciter coil are configured by winding a single conductor around the secondary bobbin.

10. The engine ignition device of claim 1, wherein
the exciter coil is made up of a pair of coils that are wound in the same direction and connected to one another in parallel.

11. An engine ignition device that applies a high voltage to an ignition plug attached to a cylinder of an engine to produce spark discharges in the ignition plug, the engine ignition device comprising:
a magneto generator that is provided with a magneto rotor having a three-pole magnetic field formed at an outer circumference of a flywheel attached to a crank shaft of the engine and a stator having an armature core with a magnetic pole part opposed to the poles of the magnetic field of the magneto rotor and having a plurality of coils served as magneto coils which are wound around the armature core, the plurality of coils including an exciter coil and a primary coil of an ignition coil and a secondary coil of the ignition coil, the magneto generator sequentially outputting, from the magneto coils, a first half-wave voltage, a second half-wave voltage of a different polarity from the first half-wave voltage, and a third half-wave voltage of the same polarity as the first half-wave voltage during one rotation of the crank shaft;
an ignition capacitor that is provided on a primary side of the ignition coil;
a charging switch that is provided so as to be turned on when the second half-wave voltage is induced in the exciter coil and to form a circuit that charges the ignition capacitor with the second half-wave voltage;
an ignition switch that is provided so as to be turned on when an ignition signal is provided and to form a discharging circuit that discharges, through the primary coil, electric charge accumulated in the ignition capacitor; and
a microcomputer that is programmed so as to perform
a processing for detecting an ignition timing of the engine,
a processing for supplying an ignition signal to the ignition switch to place the ignition switch to be turned on in order to produce a first spark discharge in the ignition plug when the ignition timing is detected,
a processing for controlling the ignition switch and the charging switch so as to give rise to a state in which both the ignition switch and the charging switch are in an open state thereby preventing current from flowing to the primary coil while insulation across a discharge gap of the ignition plug is in broken down state due to the first spark discharge, wherein
the engine ignition device being configured so that a second spark discharge is produced in the ignition plug due to a voltage induced in the secondary coil of the ignition coil accompanied with a change in magnetic flux that is inputted to the armature core from the magneto rotor while the insulation across the discharge gap of the ignition plug is in the broken down state due to the first spark discharge.

12. The engine ignition device of claim 11, wherein
the engine ignition device is further provided with a rotation detection circuit that detects a specific feature in a waveform of voltage induced in the exciter coil and outputs a plurality of rotation detection signals which include a rotation detection signal generated at a reference position set at a position coming before a crank angle position coming when a piston of the engine reaches top dead center, and
the microcomputer is programmed so as to identify, from among the plurality of rotation detection signals outputted by the rotation detection circuit, a rotation detection signal generated at the reference position as a reference signal and to detect the ignition timing based on a timing at which the reference signal was generated and generate an ignition signal.

13. The engine ignition device of claim 12, wherein
the microcomputer is programmed so as to perform a stroke discrimination process for discriminating whether a stroke of the engine performed when the reference signal was generated is a compression stroke or an exhaust stroke and to perform control that places the ignition switch in the ON state at the ignition timing only when the stroke of the engine performed when the reference signal was generated is discriminated to be a compression stroke by the stroke discrimination process.

14. The engine ignition device of claim 13, wherein
a breakdown voltage detection circuit is provided that obtains a voltage signal including information relating to a voltage across the discharge gap of the ignition plug from partway along the secondary coil, and
the microcomputer is programmed so as to perform stroke discrimination on the basis of the fact that a magnitude of the voltage signal obtained from the breakdown voltage detection circuit when the insulation across the discharge gap of the ignition plug is broken down differs between when a stroke of the engine is an exhaust stroke and when a stroke of the engine is a compression stroke.

15. The engine ignition device of claim 11, wherein
the engine ignition device is provided with a power supply circuit that generates a control DC voltage using the first half-wave voltage and the third half-wave voltage induced in the exciter coil, and
a CPU of the microcomputer operates using the control DC voltage generated by the power supply circuit as a power supply voltage.

* * * * *